US011167750B2

(12) United States Patent
Miki

(10) Patent No.: US 11,167,750 B2
(45) Date of Patent: Nov. 9, 2021

(54) LEANING VEHICLE PROVIDED WITH A LEANING POSTURE CONTROL ACTUATOR AND LEFT AND RIGHT INCLINING WHEELS

(71) Applicant: YAMAHA HATSUDOKI KABUSHIKI KAISHA, Iwata (JP)

(72) Inventor: Masayuki Miki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 218 days.

(21) Appl. No.: 16/164,254

(22) Filed: Oct. 18, 2018

(65) Prior Publication Data

US 2019/0047550 A1    Feb. 14, 2019

Related U.S. Application Data

(63) Continuation-in-part of application No. PCT/JP2017/015602, filed on Apr. 18, 2017.

(30) Foreign Application Priority Data

Apr. 18, 2016    (JP) .............................. JP2016-083090

(51) Int. Cl.
*B60W 30/045*    (2012.01)
*B60W 10/04*    (2006.01)
(Continued)

(52) U.S. Cl.
CPC .........  *B60W 30/045* (2013.01); *B60T 8/1764* (2013.01); *B60W 10/04* (2013.01);
(Continued)

(58) Field of Classification Search
CPC .. B60W 30/045; B60W 10/04; B60W 10/184; B60W 2300/367; B60W 2520/06;
(Continued)

(56) References Cited

U.S. PATENT DOCUMENTS

| 8,123,240 | B2 | 2/2012 | Mercier |
| 2011/0275256 | A1 | 11/2011 | Gibbs et al. |
| 2012/0232758 | A1* | 9/2012 | Mercier ............. B60G 17/0162 701/41 |

FOREIGN PATENT DOCUMENTS

DE    102008021523 A1 * 12/2008    ............... B62K 5/01
JP    2011-126514 A    6/2011
(Continued)

*Primary Examiner* — Aaron L Troost
(74) *Attorney, Agent, or Firm* — Rabin & Berdo, P.C.

(57)    ABSTRACT

A leaning vehicle includes a leaning body frame, a left inclining wheel, a right inclining wheel, an another inclining wheel, a linkage mechanism, a leaning posture control actuator, a left inclining wheel torque applying unit, a right inclining wheel torque applying unit, and an integrated control device. The integrated control device controls a left inclining wheel torque applied to a left inclining wheel and a right inclining wheel torque applied to a right inclining wheel based on a lean torque applied to the linkage mechanism by the leaning posture control actuator. Alternatively, the lean torque applied to the linkage mechanism by the leaning posture control actuator may be based on the left inclining wheel torque applied to the left inclining wheel by the left inclining wheel torque applying unit and the right inclining wheel torque applied to the right inclining wheel by the right inclining wheel torque applying unit.

10 Claims, 16 Drawing Sheets

(51) Int. Cl.
*B60W 10/184* (2012.01)
*B60T 8/1764* (2006.01)
*B62K 5/05* (2013.01)
*B62K 5/10* (2013.01)

(52) U.S. Cl.
CPC ............ *B60W 10/184* (2013.01); *B62K 5/05* (2013.01); *B62K 5/10* (2013.01); *B60W 2300/367* (2013.01); *B60W 2520/06* (2013.01); *B60W 2520/10* (2013.01); *B60W 2520/12* (2013.01); *B60W 2520/18* (2013.01); *B60W 2520/20* (2013.01); *B60W 2520/26* (2013.01)

(58) Field of Classification Search
CPC ......... B60W 2520/10; B60W 2520/12; B60W 2520/18; B60W 2520/20; B60W 2520/26; B60T 8/1764; B62K 5/05; B62K 5/10; B62K 5/27
See application file for complete search history.

(56) References Cited

FOREIGN PATENT DOCUMENTS

| | | | |
|---|---|---|---|
| JP | 2011-524836 A | | 9/2011 |
| JP | 2013-144471 A | | 7/2013 |
| JP | 2013144471 A | * | 7/2013 |
| WO | 2011029795 A1 | | 3/2011 |

* cited by examiner

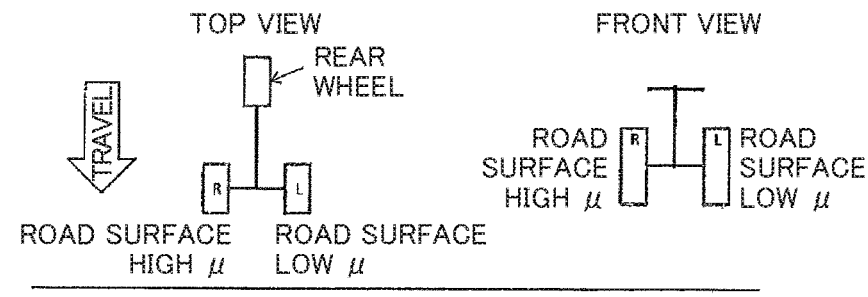

TOP VIEW     FRONT VIEW (a) Brake operation is performed on front wheels.

(b) ABS is actuated

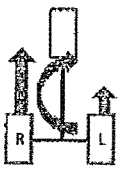

(c) Vehicle body frame leans leftward by centrifugal force caused by right turning force.

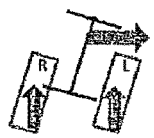

(d) Left steering due to left lean

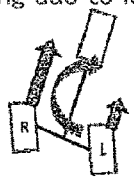

(e) Roll torque that raises vehicle body frame by posture control

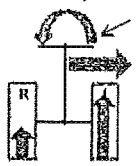

(f) Left turning force is generated by braking force difference due to tire load difference.

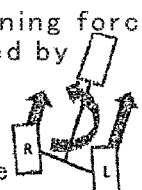

(g) Vehicle body frame leans rightward by centrifugal force caused by left turning force.

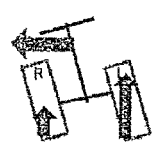

(h) Right steering due to right lean

(i) Roll torque that raises vehicle body frame by posture control

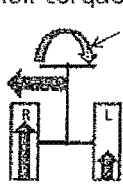

(j) Right turning force is generated by braking force difference due to tire load difference.

FIG. 10

LEANING VEHICLE PROVIDED WITH A LEANING POSTURE CONTROL ACTUATOR AND LEFT AND RIGHT INCLINING WHEELS

CROSS-REFERENCES TO RELATED APPLICATIONS

The present application is a continuation-in-part application of International Application No. PCT/JP2017/015602, filed on Apr. 18, 2017, and having the benefit of the earlier filing date of Japanese Application No. 2016-083090, filed Apr. 18, 2016. The content of each of the identified applications is incorporated herein by reference in its entirety.

TECHNICAL FIELD

The present teaching relates to a leaning vehicle including left and right inclining wheels, a linkage mechanism that integrally leans the left and right inclining wheels and a body frame leftward or rightward, and a leaning posture control actuator that controls the linkage mechanism to control leaning postures of the left and right inclining wheels and the body frame.

BACKGROUND ART

Patent Document 1 describes a leaning vehicle including a frame, a left front wheel, a right front wheel, a left support arm supporting the left front wheel on the frame, a right support arm supporting the right front wheel on the frame, and an actuator for applying forces that enable the left support arm and the right support arm to rotate about an axis extending in a vehicle front-rear direction. The actuator described in Patent Document 1 is disposed to overlap the left support arm and the right support arm in a vehicle plan view.

CITATION LIST

Patent Document

Patent Document 1: U.S. Pat. No. 8,123,240

SUMMARY OF INVENTION

Technical Problem

With the conventional technique described in Patent Document 1, when the vehicle speed is a threshold or less and the frame is in a lean position in the leaning vehicle, the actuator sets the frame in an upright position. The present teaching employs a means different from the conventional technique described above in order to enhance functions of a leaning vehicle including a leaning posture control actuator and left and right wheels.

Solution to Problem

An inventor of the present teaching studied an anti-lock brake system (ABS) as a means for enhancing functions of a leaning vehicle including a leaning posture control actuator and left and right wheels. The inventor found that when operations of the ABS and the leaning posture control actuator are simply combined, a behavior of the leaning vehicle different from a behavior expected from functions of the ABS and the leaning posture control actuator can be observed in some situations.

For example, the inventor found a phenomenon in which when a roll angle of a body frame is controlled by the leaning posture control actuator during operation of the ABS, braking forces on the left wheel and the right wheel vary. Further study shows that loads on the left wheel and the right wheel vary by control of the leaning posture control actuator. When the loads on the left wheel and the right wheel vary, skid limits of the left wheel and the right wheel change. It was found that this change in skid limit causes a braking force different from an expected braking force in some cases.

Further study shows the presence of a correlation between a torque on the leaning posture control actuator and loads on the left wheel and the right wheel. Based on the foregoing findings, the inventor studied how to enhance functions.

Through the study, the inventor has obtained the following enhancement of a function. First, the inventor found that control of adjusting braking forces on the left wheel and the right wheel based on a torque of the leaning posture control actuator can obtain an expected braking force in some cases. The inventor also found that an expected braking force can also be obtained by adjusting a torque of the leaning posture control actuator in accordance with braking forces on the left wheel and the right wheel.

Based on the foregoing findings, the inventor further studied enhancement of another function. The inventor arrived at control of adjusting driving forces on the left wheel and the right wheel based on a torque on the leaning posture control actuator using the left wheel and the right wheel as driving wheels by using a correlation between the torque on the leaning posture control actuator and the loads on the left wheel and the right wheel. The inventor found that this control can efficiently obtain a driving torque in some cases. The adjustment of driving forces is performed by, for example, traction control. The inventor also found that a driving torque can be more efficiently obtained in some cases by adjusting a torque on the leaning posture control actuator in accordance with driving forces on the left wheel and the right wheel.

(First Configuration)

A leaning vehicle with a first configuration as an embodiment of the present teaching includes: a leaning body frame, a left inclining wheel, a right inclining wheel, another inclining wheel, a linkage mechanism, a leaning posture control actuator, a left inclining wheel torque applying unit, a right inclining wheel torque applying unit, and an integrated control device. The leaning vehicle is a leaning vehicle provided with a leaning posture control actuator and left and right inclining wheels. The leaning body frame leans leftward when the vehicle is turning leftward in a left-right direction of the vehicle, and leans rightward when the vehicle is turning rightward in the left-right direction of the vehicle. The left inclining wheel is supported on the leaning body frame, leans leftward when the vehicle is turning leftward when the vehicle is turning leftward in the left-right direction of the vehicle, and leans rightward when the vehicle is turning rightward in the left-right direction of the vehicle. The right inclining wheel is supported on the leaning body frame, is disposed at a side of the left inclining wheel in the left-right direction of the vehicle, leans leftward when the vehicle is turning leftward in the left-right direction of the vehicle, and leans rightward when the vehicle is turning rightward in the left-right direction of the vehicle. The another inclining wheel is supported on the leaning body frame, is disposed ahead of or behind the left inclining wheel and the right inclining wheel in a front-rear direction of the vehicle, leans leftward when the vehicle is turning leftward in the left-right direction of the vehicle, and leans rightward when the vehicle is turning rightward in the left-right direction of the vehicle. The linkage mechanism includes a rotary member that is rotatably supported on the body frame and supports the left inclining wheel and the right inclining wheel. In the linkage mechanism, the rotary member rotates in accordance with a lean of the leaning body frame in the left-right direction of the vehicle. Rotation of the rotary member changes the relative positions of the left inclining wheel and the right inclining wheel in the top-bottom direction relative to the body frame. The leaning posture control actuator controls a leaning posture of the leaning body frame in the left-right direction of the vehicle by applying, to the linkage mechanism, a lean torque that is a force of rotating the rotary member of the linkage mechanism with respect to the leaning body frame. The left inclining wheel torque applying unit applies, to the left inclining wheel, a left inclining wheel torque that is a torque of the left inclining wheel about an axle. The right inclining wheel torque applying unit applies, to the right inclining wheel, a right inclining wheel torque that is a torque of the right inclining wheel about an axle. The integrated control device integrally controls the leaning posture control actuator, the left inclining wheel torque applying unit, and the right inclining wheel torque applying unit. The integrated control device either controls the left inclining wheel torque applied to the left inclining wheel by the left inclining wheel torque applying unit and the right inclining wheel torque applied to the right inclining wheel by the right inclining wheel torque applying unit based on the lean torque applied to the linkage mechanism by the leaning posture control actuator or controls the lean torque applied to the linkage mechanism by the leaning posture control actuator based on the left inclining wheel torque applied to the left inclining wheel by the left inclining wheel torque applying unit and the right inclining wheel torque applied to the right inclining wheel by the right inclining wheel torque applying unit.

With the first configuration, the leaning posture control actuator applies a lean torque of rotating the rotary member of the linkage mechanism with respect to the leaning body frame. When the lean torque is applied, loads on the left inclining wheel and the right inclining wheel supported on the frame by the linkage mechanism vary. Based on the lean torque, the integrated control device controls a torque of rotation of the left inclining wheel about the axle, that is, the left inclining wheel torque, and a torque of rotation of the right inclining wheel about the axle, that is, the right inclining wheel torque. Accordingly, the integrated control device can control the left inclining wheel torque and the right inclining wheel torque in accordance with the loads on the left inclining wheel and the right inclining wheel that vary depending on the lean torque. Accordingly, a braking force or a driving force of the left inclining wheel on the road surface and a braking force or a driving force of the right inclining wheel on the road surface can be controlled in accordance with variations of the load on the left inclining wheel and the load on the right inclining wheel. As a result, an expected braking force or an efficient driving force, for example, can be obtained. In the manner described above, functions of the leaning vehicle provided with the leaning posture control actuator and the left and right wheels can be enhanced.

(Second Configuration)

In the first configuration, the integrated control device may cause the leaning posture control actuator to apply, to the linkage mechanism, a lean torque of leaning the body frame leftward or rightward in the left-right direction of the vehicle in at least a part of a period in which the left inclining wheel torque applied to the left inclining wheel by the left inclining wheel torque applying unit is different from the right inclining wheel torque applied to the right inclining wheel by the right inclining wheel torque applying unit.

(Third Configuration)

In the first or second configuration, the integrated control device can make the left inclining wheel torque applied to the left inclining wheel by the left inclining wheel torque applying unit and the right inclining wheel torque applied to the right inclining wheel by the right inclining wheel torque applying unit different from each other in at least a period in which period in which the leaning posture control actuator applies, to the linkage mechanism, a lean torque of leaning the body frame leftward or rightward in the left-right direction of the vehicle. Accordingly, in a case where the loads on the left inclining wheel and the right inclining wheel are different from each other, the left inclining wheel torque and the right inclining wheel torque can be made different from each other by the lean torque.

(Fourth Configuration)

In the third configuration, the integrated control device can control the left inclining wheel torque applied by the left inclining wheel torque applying unit and the right inclining wheel torque applied by the right inclining wheel torque applying unit such that a braking force or a driving force on rotation of the left inclining wheel about the axle is larger than a braking force or a driving force on rotation of the right inclining wheel about the axle, in a case where the leaning posture control actuator generates a lean torque of leaning the body frame rightward in the left-right direction of the vehicle. In this case, the integrated control device can control the right inclining wheel torque applied by the right inclining wheel torque applying unit and the left inclining wheel torque applied by the left inclining wheel torque applying unit such that a braking force or a driving force on rotation of the right inclining wheel about the axle is larger than a braking force or a driving force on rotation of the left inclining wheel about the axle, in a case where the leaning posture control actuator generates a lean torque of leaning the body frame leftward in the left-right direction of the vehicle. Accordingly, a braking force or a driving force of one of the left inclining wheel and the right inclining wheel whose load has been reduced depending on the lean torque of the leaning posture control actuator on the road surface can be reduced, and a braking force or a driving force of the inclining wheel whose load has been increased depending on the lean torque on the road surface can be increased. For example, this configuration enables control of maximizing a braking force or a driving force can be performed in accordance with loads on the left inclining wheel and the right inclining wheel depending on the lean torque.

(Fifth Configuration)

In the third configuration, the integrated control device can control the left inclining wheel torque applied by the left inclining wheel torque applying unit and the right inclining wheel torque applied by the right inclining wheel torque applying unit such that a braking force or a driving force on rotation of the left inclining wheel about the axle is smaller than a braking force or a driving force on rotation of the right inclining wheel about the axle, in a case where the leaning posture control actuator generates a lean torque of leaning the body frame rightward in the left-right direction of the vehicle. In this case, the integrated control device can control the right inclining wheel torque applied by the right inclining wheel torque applying unit and the left inclining wheel torque applied by the left inclining wheel torque applying unit such that a braking force or a driving force on rotation of the right inclining wheel about the axle is smaller than a braking force or a driving force on rotation of the left inclining wheel about the axle, in a case where the leaning posture control actuator generates a lean torque of leaning the body frame leftward in the left-right direction of the vehicle. Accordingly, a braking force or a driving force of one of the left inclining wheel and the right inclining wheel whose load has been reduced depending on the lean torque of the leaning posture control actuator on the road surface can be increased, and a braking force or a driving force of the inclining wheel whose load has been increased depending on the lean torque on the road surface can be reduced. This configuration enables control of minimizing a difference in a braking force or a driving force between the left inclining wheel and the right inclining wheel in accordance with the loads on the left inclining wheel and the right inclining wheel depending on the lean torque, for example.

(Sixth Configuration)

In any one of the first through fifth configurations, the leaning vehicle may further include: a left skid ratio detector that detects a skid ratio of the left inclining wheel; and a right skid ratio detector that detects a skid ratio of the right inclining wheel. In this case, the integrated control device may include a brake control unit that adjusts the left inclining wheel torque that brakes rotation of the left inclining wheel about the axle by the left inclining wheel torque applying unit based on the skid ratio of the left inclining wheel detected by the left skid ratio detector and adjusts the right inclining wheel torque that brakes rotation of the right inclining wheel about the axle by the right inclining wheel torque applying unit based on the skid ratio of the right inclining wheel detected by the right skid ratio detector. The integrated control device can set at least one of a left target skid ratio of the left inclining wheel or a right target skid ratio of the right inclining wheel based on the lean torque applied by the leaning posture control actuator. The brake control unit starts adjustment of the left inclining wheel torque that brakes rotation of the left inclining wheel about the axle by the left inclining wheel torque applying unit in a case where the skid ratio of the left wheel reaches the left target skid ratio, and starts adjustment of the right inclining wheel torque that brakes rotation of the right inclining wheel about the axle by the right inclining wheel torque applying unit in a case where the skid ratio of the right inclining wheel reaches the right target skid ratio.

The brake control unit with the sixth configuration can constitute an ABS. In the ABS, braking forces of the left inclining wheel and the right inclining wheel can be adjusted in conformity with variations in load depending on the lean torque of the leaning posture control actuator.

(Seventh Configuration)

In the sixth configuration, the integrated control device can set at least one of the left target skid ratio of the left inclining wheel or the right target skid ratio of the right inclining wheel such that the left target skid ratio of the left inclining wheel and the right target skid ratio of the right inclining wheel are different from each other in at least a part of a period in which the leaning posture control actuator applies, to the linkage mechanism, a lean torque of leaning the leaning body frame leftward or rightward in the left-right direction of the vehicle.

(Eighth Configuration)

In the seventh configuration, the integrated control device can set at least one of the left target skid ratio of the left inclining wheel or the right target skid ratio of the right inclining wheel such that the right target skid ratio of the right inclining wheel is larger than the left target skid ratio of the left inclining wheel in at least a part of a period in which the leaning posture control actuator applies, to the linkage mechanism, a lean torque of leaning the leaning body frame leftward in the left-right direction of the vehicle. In this case, the integrated control device sets at least one of the left target skid ratio of the left inclining wheel or the right target skid ratio of the right inclining wheel such that the left target skid ratio of the left inclining wheel is larger than the right target skid ratio of the right inclining wheel in at least a part of a period in which the leaning posture control actuator applies, to the linkage mechanism, a lean torque of leaning the leaning body frame rightward in the left-right direction of the vehicle.

Alternatively, in the seventh configuration, the integrated control device can set at least one of the left target skid ratio of the left inclining wheel or the right target skid ratio of the right inclining wheel such that the right target skid ratio of the right inclining wheel is smaller than the left target skid ratio of the left inclining wheel in at least a part of a period in which the leaning posture control actuator applies, to the linkage mechanism, a lean torque that leans the leaning body frame leftward in the left-right direction of the vehicle. In this case, the integrated control device sets at least one of the left target skid ratio of the left inclining wheel or the right target skid ratio of the right inclining wheel such that the left target skid ratio of the left inclining wheel is smaller than the right target skid ratio of the right inclining wheel in at least a part of a period in which the leaning posture control actuator applies, to the linkage mechanism, a lean torque that leans the leaning body frame rightward in the left-right direction of the vehicle.

(Ninth Configuration)

In any one of the first through eighth configurations, the leaning vehicle may further include a rotation angle detector that detects a rotation angle of the leaning posture control actuator. In this case, the integrated control device can control the left inclining wheel torque applied to the left inclining wheel by the left inclining wheel torque applying unit and the right inclining wheel torque applied to the right inclining wheel by the right inclining wheel torque applying unit based on the lean torque applied to the linkage mechanism by the leaning posture control actuator and the rotation angle detected by the rotation angle detector.

(Tenth Configuration)

In any one of the first through ninth configurations, the leaning vehicle may further include a lean detector that detects a lean state of the leaning body frame in the left-right direction of the vehicle. In this case, the integrated control device may control the left inclining wheel torque applied to the left inclining wheel by the left inclining wheel torque applying unit and the right inclining wheel torque applied to the right inclining wheel by the right inclining wheel torque applying unit based on the lean torque applied to the linkage mechanism by the leaning posture control actuator and the lean state detected by the lean detector.

Advantages of Invention

According to the present teaching, functions of a leaning vehicle including a leaning posture control actuator and left and right wheels can be enhanced.

BRIEF DESCRIPTION OF DRAWINGS

FIG. 10 is a conceptual illustration showing a behavior of the straddled vehicle.

DESCRIPTION OF EMBODIMENTS

Figure 1:
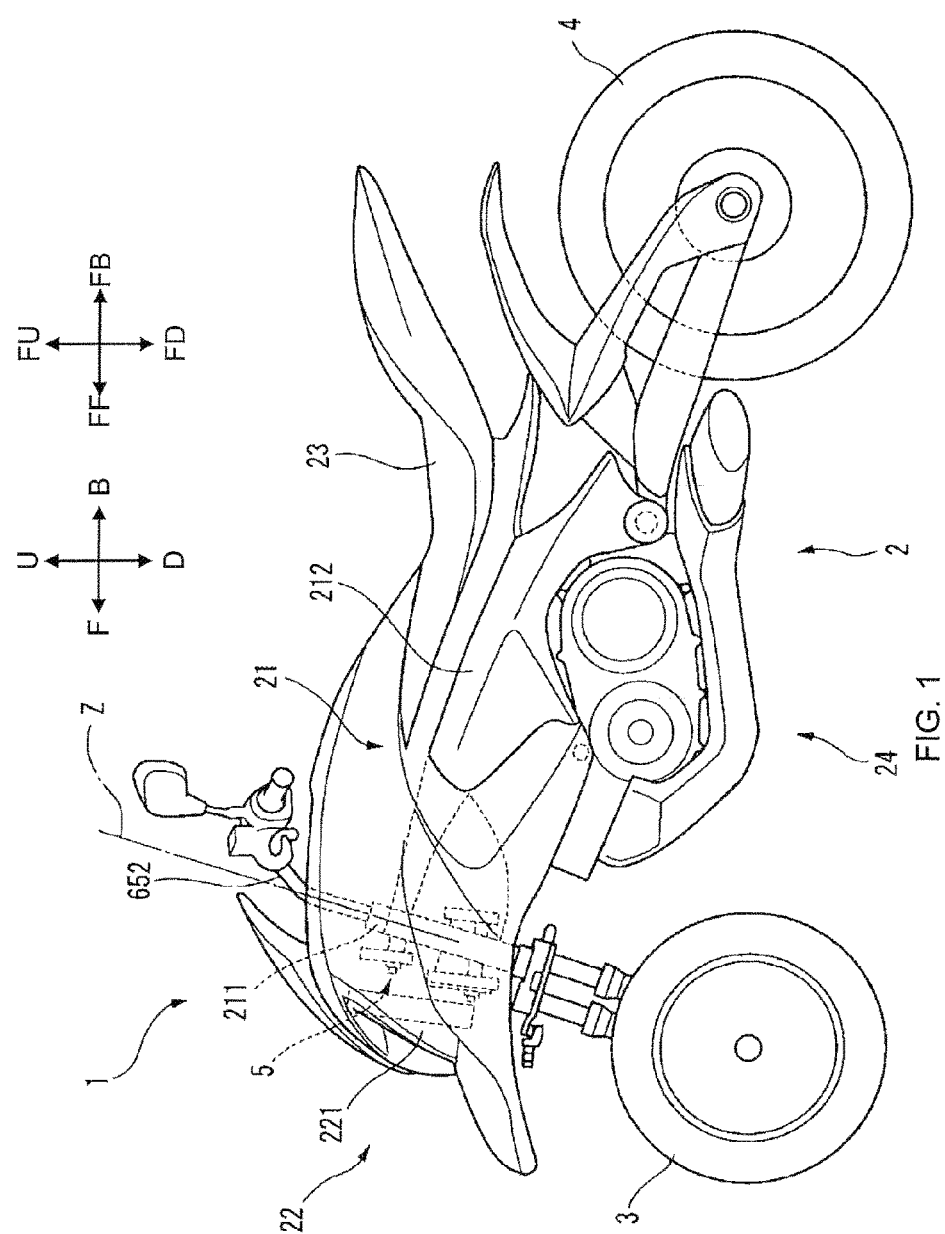
FIG. 1 is a side view of a vehicle according to one embodiment of the present teaching.

In the following description, a roll actuator corresponds to the leaning posture control actuator described above.

Through study, the inventor found a yaw variation is caused by causes (1) through (3) as follows:
(1) A difference in friction coefficient μ between road surfaces contacting left and right wheels
(2) A variation in tire loads on the left and right wheels by the roll actuator
(3) Shaking in steering Causes (1) and (2) are assumed to affect the skid limit of tires, and a difference in ABS skid cycle occurs between the left and right wheels to cause a yaw variation. Cause (2) is based on the assumption that the tire loads vary significantly to greatly affect yaw variations. Cause (3) is based on the assumption that a combination of reasons (1) and (2) causes shaking in steering because of yaw variations, and this shaking in steering causes the yaw to further vary.

The inventor has intensively studied and identified the causes, and came up with an idea of changing a skid ratio based on an obtained roll torque which is an output of the roll actuator. The inventor found that the change in skid ratio based on the roll torque can suppress cause (2) and also suppress cause (3).

An embodiment of the present teaching is directed to a straddled vehicle including: a left steering wheel; a right steering wheel; a non-steering wheel disposed in a front-rear direction of the vehicle relative to the left steering wheel and the right steering wheel; a lean mechanism that integrally leans the left steering wheel, the right steering wheel, and the vehicle body; and a roll actuator that controls the lean mechanism to control leaning postures of the left steering wheel, the right steering wheel, and the vehicle body. The straddled vehicle includes: a roll torque detector that detects a roll torque of the roll actuator; a skid ratio setting unit that sets a left target skid ratio of the left steering wheel and/or a right target skid ratio of the right steering wheel based on the roll torque detected by the roll torque detector; and a skid suppression control unit that controls brake fluid pressures of the left and right steering wheels based on the left target skid ratio and/or the right target skid ratio set by the skid ratio setting unit.

With this configuration, in the case where an ABS is actuated in a situation where friction coefficients μ of road surfaces respectively contacting the left and right wheels are different from each other, a behavior or a posture change of the vehicle can be suppressed.

In the embodiment of the present teaching, the straddled vehicle may further include a rotation angle detector that detects a rotation angle of the roll actuator. In this case, the skid ratio setting unit may set the left target skid ratio and/or the right target skid ratio based on the roll torque detected by the roll torque detector and the rotation angle detected by the rotation angle detector.

With this configuration, it is possible to correct a mechanical loss and non-linearity due to a lean of the vehicle or deformation of the lean mechanism because of a slope of a road surface. Accordingly, the behavior or the posture change of the vehicle can be further suppressed.

In the embodiment of the present teaching, the straddled vehicle may further include a lean detector (roll angle sensor) that detects a lean state (roll angle) of the vehicle body. In this case, the skid ratio setting unit may set the left target skid ratio and/or the right target skid ratio based on the roll torque detected by the roll torque detector and the lean state (roll angle) detected by the lean detector.

With this configuration, it is possible to correct a mechanical loss and non-linearity due to a lean of the vehicle or deformation of the lean mechanism because of a slope of a road surface. Thus, the behavior or the posture change can be further suppressed.

In the embodiment of the present teaching, the skid ratio setting unit may perform setting of reducing the left target skid ratio to the left steering wheel in the case of an increase in a roll torque in a direction in which the load on the left steering wheel increases detected by the roll torque detector, and/or may perform setting of reducing the right target skid ratio to the right steering wheel in the case of an increase in a roll torque in a direction in which the load on the right steering wheel increases detected by the roll torque detector.

In the embodiment of the present teaching, the skid ratio setting unit may perform setting of increasing the left target skid ratio to the left steering wheel in the case of an increase in where a roll torque in a direction in which the load on the left steering wheel increases detected by the roll torque detector, and/or may perform setting of increasing the right target skid ratio to the right steering wheel in the case of an increase in a roll torque in a direction in which the load on the right steering wheel increases detected by the roll torque detector.

In the embodiment of the present teaching, the skid ratio setting unit may perform setting of reducing the left target skid ratio to the left steering wheel in accordance with an increase in the roll torque of the left steering wheel in a case where the amount of an increase in the roll torque in the direction in which the load on the left steering wheel increases detected by the roll torque detector exceeds a threshold, and/or may perform setting of reducing the right target skid ratio to the right steering wheel in accordance with an increase in the roll torque in the direction in which the load on the right steering wheel increases in a case where the amount of an increase in the roll torque in the direction in which the load on the right steering wheel increases detected by the roll torque detector exceeds a threshold.

In the embodiment of the present teaching, the left and right steering wheels may be symmetric in the left-right direction with respect to the vehicle center line (imaginary line) in the front-rear direction. In this configuration, a linear distance between center points of ground-contact portions of wheels on the same axle may be less than 460 mm That is, the distance between the center point of the ground-contact portion of the left steering wheel and the center point of the ground-contact portion of the right steering wheel when the vehicle in a straight-traveling posture is placed on a flat surface may be less than 460 mm. In this case, the straddled vehicle may include the lean mechanism that turns while leaning the left and right steering wheels and a part of or all the vehicle body. Here, the vehicle center line is a horizontal line that passes through the center point of a line connecting the center points of the ground-contact portions of the left and right wheels when the vehicle in the straight-traveling posture is placed on a flat surface and is perpendicular to this line.

In the embodiment of the present teaching, the left and right steering wheels may be symmetric in the left-right direction with respect to the vehicle center line in the front-rear direction. In this configuration, a linear distance between center points of ground-contact portions of wheels on the same axle may be 460 mm or more. That is, the distance between the center point of the ground-contact portion of the left steering wheel and the center point of the ground-contact portion of the right steering wheel when the vehicle in the straight-traveling posture is placed on a flat surface may be 460 mm or more. In this case, the straddled vehicle may include the lean mechanism that turns while leaning the left and right steering wheels and a part of or all the vehicle body.

In the embodiment of the present teaching, in a case where the roll actuator is an electric motor actuator, the roll torque detector may detect an instruction value or a current value, for example, to the electric motor, as a roll torque. In the case where the roll actuator is a hydraulic actuator, the roll torque detector may detect a hydraulic value (sensor detection value) as a roll torque. Alternatively, the roll torque detector may obtain a roll torque from load variation amounts of the left and right steering wheels.

As an embodiment of the present teaching, the straddled vehicle may further include:

a left wheel speed sensor that detects a left front (or left rear) wheel speed;

a right wheel speed sensor that detects a right front (right rear) wheel speed;

a longitudinal acceleration sensor that detects a longitudinal acceleration;

a wheel speed sensor that detects a rear (or front) wheel speed;

a vehicle body speed calculator that calculates a vehicle body speed based on (all or a part of) the longitudinal acceleration, the wheel speed, the left wheel speed, and the right wheel speed;

a left skid ratio calculator that calculates a left calculated skid ratio based on the vehicle body speed obtained by the vehicle body speed calculator and the left front (or left rear) wheel speed obtained by the left wheel speed sensor;

a right skid ratio calculator that calculates a right calculated skid ratio based on the vehicle body speed obtained by the vehicle body speed calculator and the right front (or right rear) wheel speed obtained by the right wheel speed sensor; and a map memory that previously stores a left roll torque-skid ratio gain map in the left steering wheel and a right roll torque-skid ratio gain map in the right steering wheel.

The skid ratio setting unit may obtain a left skid ratio gain from the left roll torque-skid ratio gain map based on the roll torque detected by the roll torque detector and set a left target skid ratio based on the left skid ratio gain and the left calculated skid ratio. In addition or alternatively, the skid ratio setting unit may obtain a right skid ratio gain from the right roll torque-skid ratio gain map based on the roll torque detected by the roll torque detector and set a right target skid ratio based on the right skid ratio gain and the right calculated skid ratio.

The skid suppression control unit may control brake fluid pressures of the left and right steering wheels based on the left target skid ratio and/or the right target skid ratio set by the skid ratio setting unit.

As an embodiment of the present teaching, the straddled vehicle includes:

a body frame that can lean to the right of the vehicle when the vehicle is turning rightward and can lean to the left of the vehicle when the vehicle is turning leftward;

a right front wheel (steering wheel) and a left front wheel (steering wheel) disposed side by side in the left-right direction of the body frame; and a linkage mechanism that changes relative positions of the right front wheel and the left front wheel in a top-bottom direction of the body frame in accordance with a lean of the body frame.

The linkage mechanism includes:

a right side member extending along a right steering axis extending in the top-bottom direction of the body frame;

a left side member disposed at the left of the right side member in the left-right direction of the body frame and extending along a left steering axis parallel to the right side member;

an upper cross member having a right portion coupled to an upper portion of the right side member to be rotatable about an upper right axis extending in the front-rear direction of the body frame, a left portion coupled to an upper portion of the left side member to be rotatable about an upper left axis parallel to the upper right axis, and an intermediate portion coupled to the body frame to be rotatable about an upper intermediate axis parallel to the upper right axis and the upper left axis; and a lower cross member having a right portion coupled to a lower portion of the right side member to be rotatable about a lower right axis parallel to the upper right axis, a left portion coupled to a lower portion of the left side member to be rotatable about a lower left axis parallel to the upper left axis, and an intermediate portion coupled to the body frame to be rotatable about a lower intermediate axis parallel to the upper intermediate axis.

The straddled vehicle includes: a right buffer device that has an upper portion supported on the right side member to be rotatable about the right steering axis and a lower portion rotatably supporting the right front wheel and configured to buffer displacement of the right front wheel from the upper portion in the top-bottom direction of the body frame;

a left buffer device that has an upper portion supported on the left side member to be rotatable about the left steering axis and a lower portion rotatably supporting the left front wheel and configured to buffer displacement of the left front wheel from the upper portion in the top-bottom direction of the body frame; and a roll actuator that includes an electric motor and a speed reduction mechanism and applies a torque of the electric motor to at least one of the upper cross member or the lower cross member to thereby enable control of a lean angle of the vehicle. In this configuration, the upper cross member and the lower cross member are supported to be rotatable with respect to the body frame, and are an example of the rotary member supporting the left inclining wheel and the right inclining wheel.

As an embodiment of the present teaching, the straddled vehicle includes:

a body frame;

a left support arm supported on the body frame to be swingable about a first left axis extending in a front-rear direction of the body frame;

a right support arm supported on the body frame to be swingable about a first right axis extending in the front-rear direction of the body frame;

a left front wheel (steering wheel) supported on the left support arm to be swingable about a second left axis extending in a vehicle front-rear direction;

a right front wheel (steering wheel) supported on the right support arm to be swingable about a second right axis in the vehicle front-rear direction; and a roll actuator coupled to the left support arm and the right support arm.

The roll actuator is configured to apply a rotary force about the first left axis to the left support arm and apply a rotary force about the first right axis to the right support arm to thereby change relative positions of the left front wheel and the right front wheel in a top-bottom direction of the body frame in accordance with a lean of the body frame. In this configuration, the left support arm and the right support arm are an example of the rotary member of linkage mechanism. The rotary member of the linkage mechanism is a member rotatably supported on the body frame and supporting the left inclining wheel and the right inclining wheel. The left support arm and the right support arm may be coupled to the roll actuator through another member.

As an embodiment of the present teaching, a straddled vehicle includes:

a left brake unit that brakes rotation of the left steering wheel;

a right brake unit that brakes rotation of the right steering wheel;

a left pipe communicating with the left brake unit and filled with brake fluid;

a right pipe communicating with the right brake unit and filled with brake fluid; and a fluid pressure control unit (brake fluid pressure control unit) that can adjust a brake fluid pressure in the left pipe and a brake fluid pressure in the right pipe independently of each other.

The left brake unit may brake rotation of the left steering wheel in accordance with the level of the fluid pressure of the brake fluid filling the left pipe.

The right brake unit may brake rotation of the right steering wheel in accordance with the level of the fluid pressure of the brake fluid filling the right pipe.

The left brake unit is an example of the left inclining wheel torque applying unit. The right brake unit is an example of the right inclining wheel torque applying unit.

The straddled vehicle according to the embodiment of the present teaching can perform control of suppressing a behavior of the vehicle when an ABS is actuated in a situation where friction coefficients μ of road surfaces respectively contacting the left and right wheels are different from each other.

Embodiments of the present teaching will be described hereinafter with reference to the drawings.

In the drawings, arrow F represents the forward direction of a vehicle. Arrow B represents the rearward direction of the vehicle. Arrow U represents the upward direction of the vehicle. Arrow D represents the downward direction of the vehicle. Arrow R represents the rightward direction of the vehicle. Arrow L represents the leftward direction of the vehicle.

The vehicle turns while leaning the body frame in the left direction of the vehicle or in the right direction of the vehicle relative to the vertical direction. Thus, in addition to the directions relative to the vehicle, directions relative to the body frame are defined. In the accompanying drawings, arrow FF represents the forward direction of the body frame. Arrow FB represents the rearward direction of the body frame. Arrow FU represents the upward direction of the body frame. Arrow FD represents the downward direction of the body frame. Arrow FR represents the rightward direction of the body frame. Arrow FL represents the leftward direction of the body frame.

The "top-bottom direction of the body frame" herein refers to the top-bottom direction relative to the body frame when seen from a rider driving the vehicle. The "left-right direction of the body frame" herein refers to the left-right direction relative to the body frame when seen from the rider driving the vehicle. The "front-rear direction of the body frame" herein refers to the front-rear direction relative to the body frame when seen from the rider driving the vehicle.

In a left-right-wheel-equipped leaning vehicle to which this embodiment is applied, when the top-bottom direction of the body frame coincides with the vertical direction, the body frame is in an upright position. At this time, the top-bottom direction, the left-right direction, and the front-rear direction of the vehicle respectively coincide with the top-bottom direction, the left-right direction, and the front-rear direction of the body frame. The vertical direction is the same as a gravity direction.

When the left-right-wheel-equipped leaning vehicle to which this embodiment is applied travels with the body frame leaned in the left direction of the vehicle or in the right direction of the vehicle relative to the vertical direction during turning. At this time, the top-bottom direction of the vehicle does not coincide with the top-bottom direction of the body frame. Even when the body frame leans in the left direction or in the right direction relative to the vertical direction, however, the front-rear direction of the vehicle coincides with the front-rear direction of the body frame.

The expression "extending in the front-rear direction of the body frame" herein includes extending in a direction with a tilt relative to the front-rear direction of the body frame. In this case, a tilt of the extension direction relative to the front-rear direction of the body frame is often smaller than a tilt relative to the left-right direction of the body frame and a tilt relative to the top-bottom direction of the body frame.

The expression "extending in the left-right direction of the body frame" herein includes extending in a direction with a tilt relative to the left-right direction of the body frame. In this case, a tilt of the extension direction relative to the left-right direction of the body frame is often smaller than a tilt relative to the front-rear direction of the body frame and a tilt relative to the top-bottom direction of the body frame.

The expression "extending in the top-bottom direction of the body frame" herein includes extending in a direction with a tilt relative to the top-bottom direction of the body frame. In this case, a tilt of the extension direction relative to the top-bottom direction of the body frame is often smaller than a tilt relative to the front-rear direction of the body frame and a tilt relative to the left-right direction of the body frame.

In this embodiment, a vehicle including two front wheels (steering wheels) and one rear wheel will be described as an example of the vehicle. A tread width between the two front wheels is less than 460 mm FIG. 1 is a side view of an overall vehicle 1 when viewed from the left of the vehicle 1. As illustrated in FIG. 1, the vehicle 1 includes a vehicle body 2, a pair of left and right front wheels 3 (see FIG. 2), a rear wheel 4, and a linkage mechanism 5. The vehicle body 2 includes a body frame 21, a body cover 22, a seat 23, and a power unit 24.

The body frame 21 includes a head pipe 211 and a main frame 212. In FIG. 1, a portion of the body frame 21 hidden by the body cover 22 is indicated by broken lines. The body frame 21 supports, for example, the power unit 24 and the seat 23. The power unit 24 includes a driving source such as an engine or an electric motor and a transmission device, for example.

The linkage mechanism 5 is disposed around the head pipe 211. A steering shaft 652 is inserted in the head pipe 211 to be rotatable about a steering axis Z. The head pipe 211 supports the linkage mechanism 5.

The body frame 21 is covered with the body cover 22. The body cover 22 includes a front cover 221. The front cover 221 is disposed ahead of the seat 23. The front cover 221 covers at least a part of the linkage mechanism 5.

Figure 2:
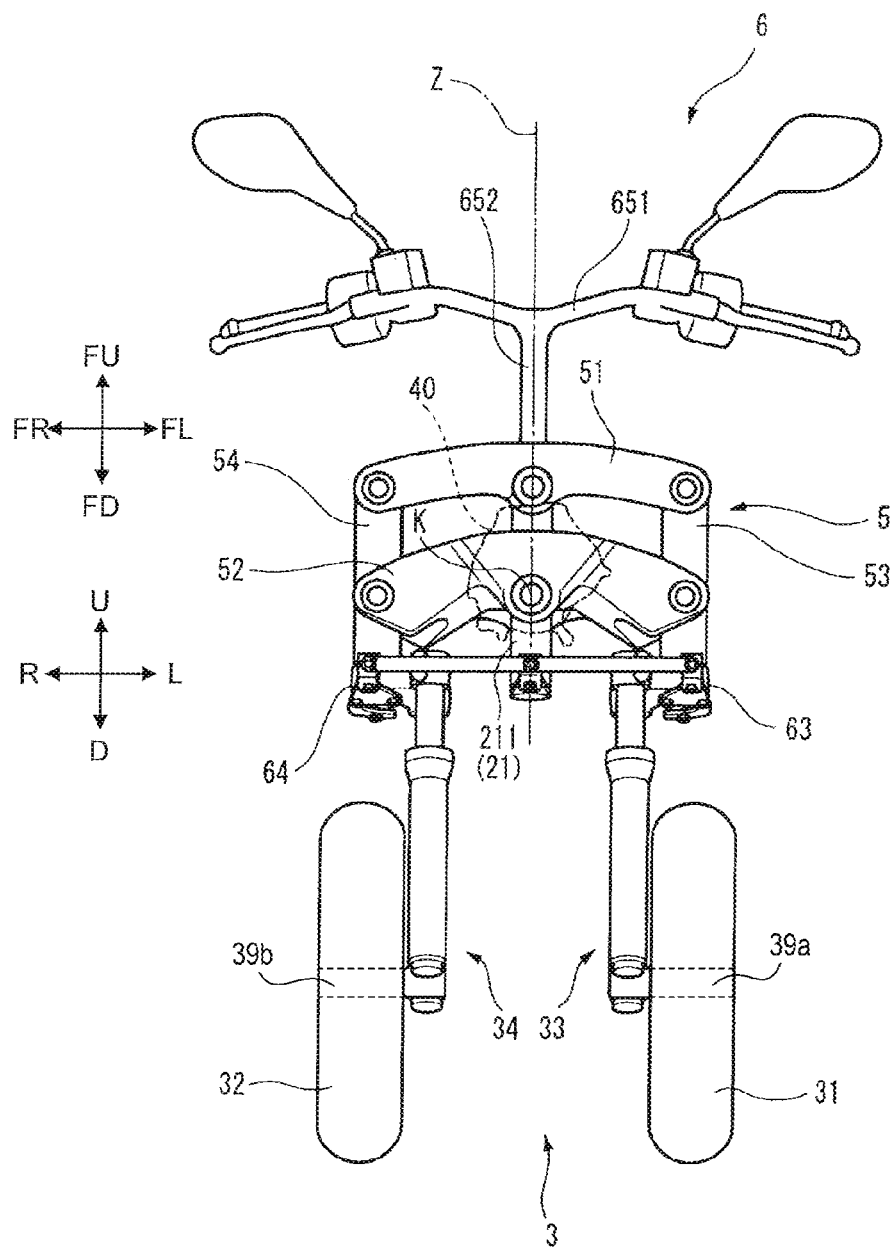
FIG. 2 is a front view of a front portion of the vehicle illustrated in FIG. 1.
Figure 3:
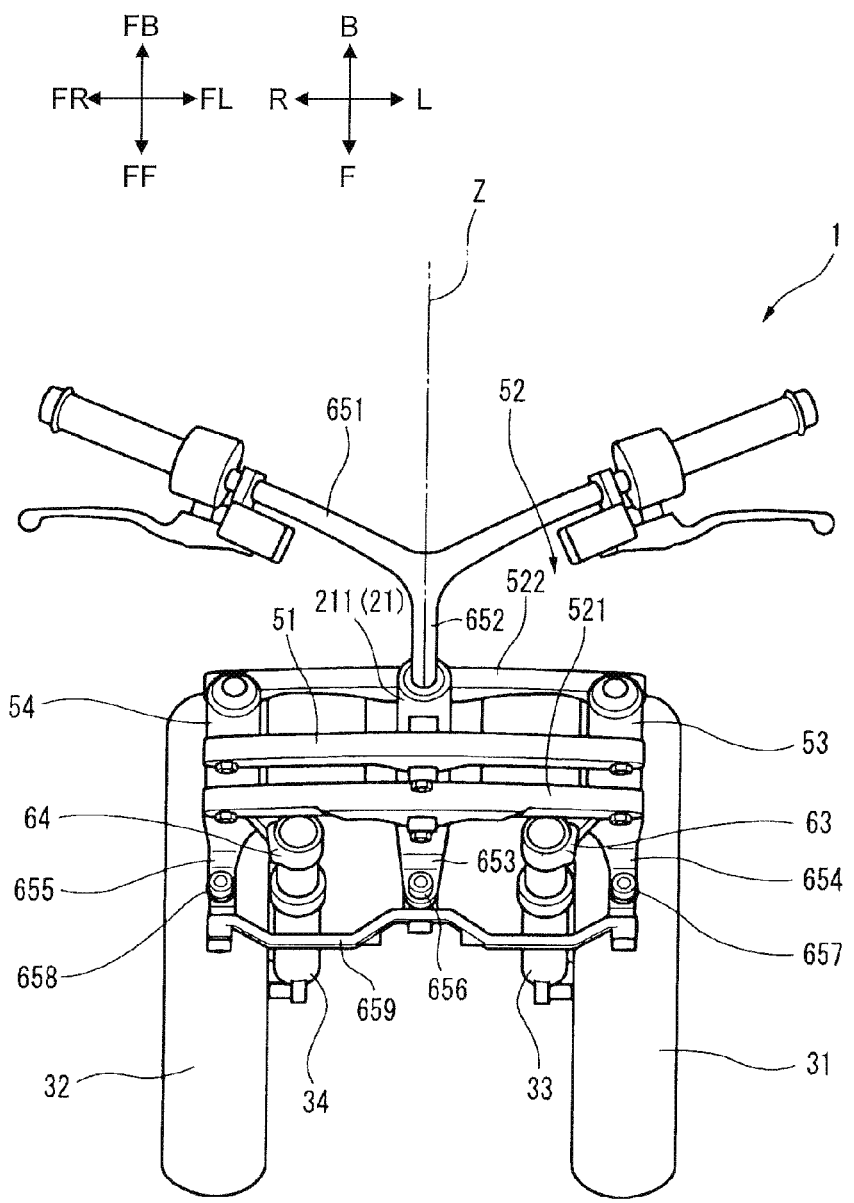
FIG. 3 is a plan view of the front portion of the vehicle illustrated in FIG. 1.

FIG. 2 is a front view of a front portion of the vehicle 1 illustrated in FIG. 1 when viewed from the front. FIG. 3 is a plan view of the front portion of the vehicle 1 illustrated in FIG. 1 when viewed from above. In FIGS. 2 and 3, the body cover 22 is illustrated transparent.

As illustrated in FIGS. 2 and 3, the vehicle 1 includes a steering force transfer mechanism 6, the linkage mechanism 5, a left buffer device 33, a right buffer device 34, and the pair of left and right front wheels 3. The left buffer device 33 supports a left front wheel 31 on the body frame 21. The right buffer device 34 supports a right front wheel 32 on the body frame 21. The left front wheel 31 may be supported on the left buffer device 33 by a first axle 39a (dashed lines representing portions of the axle not visible in the plan view), and the right front wheel 32 may be supported on the right buffer device 34 by a second axle 39b.

The left buffer device 33 is a so-called telescopic buffer device, and includes two telescopic elements arranged in the front-rear direction. Upper portions of the two telescopic elements are coupled to each other. Lower portions of the two telescopic elements are coupled to each other.

The right buffer device 34 is a so-called telescopic buffer device, and includes two telescopic elements arranged in the front-rear direction. Upper portions of the two telescopic elements are coupled to each other. Lower portions of the two telescopic elements are coupled to each other.

The steering force transfer mechanism 6 is disposed above the left front wheel 31 and the right front wheel 32. The steering force transfer mechanism 6 includes, as a member for inputting a steering force of a rider, the steering shaft 652 and a handlebar 651 coupled to an upper portion of the steering shaft 652.

The steering force transfer mechanism 6 includes a first transfer plate 653, a second transfer plate 654, a third transfer plate 655, a first joint 656, a second joint 657, a third joint 658, a tie rod 659, a first bracket 63, and a second bracket 64, in addition to the handle bar 651 and the steering shaft 652. The steering force transfer mechanism 6 transfers a steering force for operating the handlebar 651 by the rider to the first bracket 63 and the second bracket 64 through the members described above.

<Linkage Mechanism>

This example employs the linkage mechanism 5 of a parallel four-bar linkage (also called a parallelogram linkage) type. The linkage mechanism 5 is disposed below the handlebar 651. The linkage mechanism 5 is coupled to the head pipe 211 of the body frame 21. The linkage mechanism 5 includes an upper cross member 51, a lower cross member 52, a left side member 53, and a right side member 54, as a configuration for performing a lean operation of the vehicle 1. The linkage mechanism 5 includes the first bracket 63 and the left buffer device 33, as a configuration that is connected to a lower portion of the left side member 53 and leans together with the left side member 53. The linkage mechanism 5 also includes the second bracket 64 and the right buffer device 34, as a configuration that is connected to a lower portion of the right side member 54 and leans together with the right side member 54.

Figure 4:
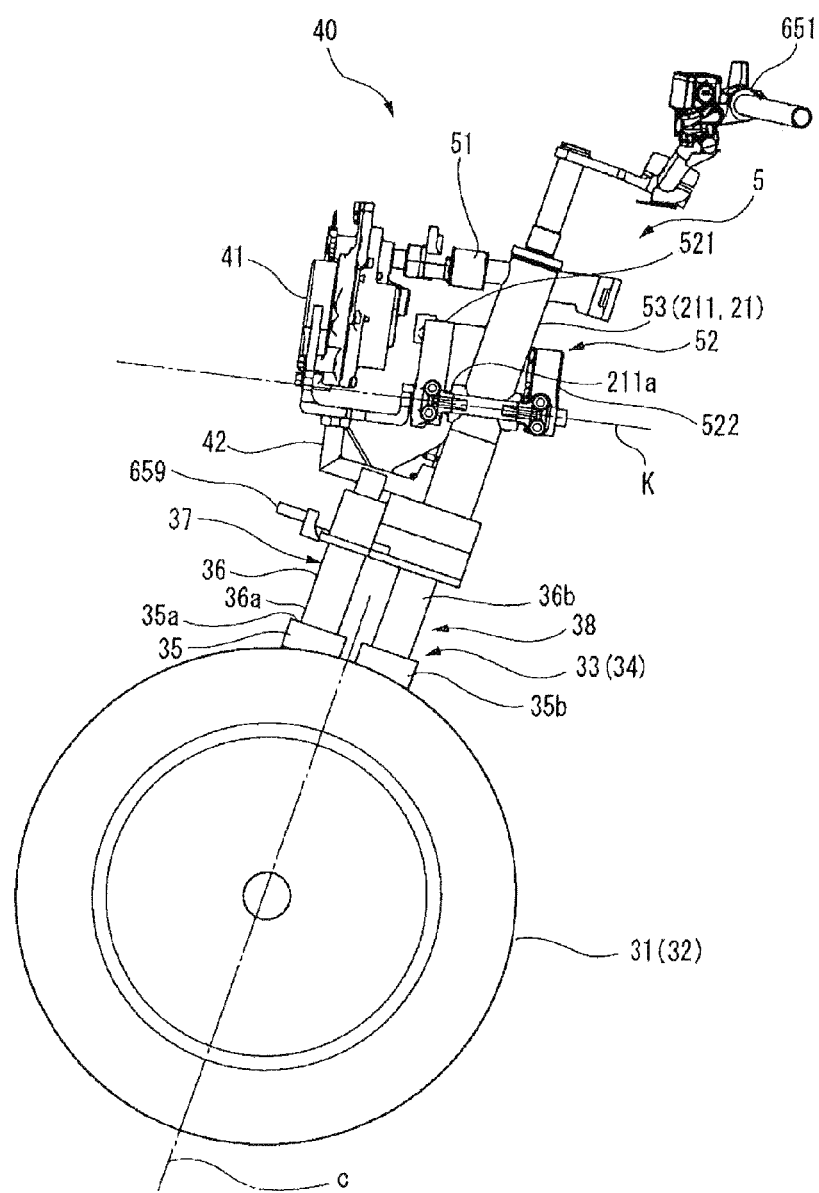
FIG. 4 is a side view of the vehicle.

Next, the roll actuator 40 will be described. FIG. 4 is a side view of the vehicle 1. As illustrated in FIG. 4, a stay 42 is disposed on a penetration portion 211a extending from the head pipe 211 forward along a lower intermediate axis K. In the side view of FIG. 4, the head pipe 211 overlaps the left side member 53. The penetration portion 211a penetrates plate-shaped members 521 and 522 of the lower cross member 52 along the lower intermediate axis K. The penetration portion 211a supports the lower cross member 52 with a bearing interposed therebetween such that the lower cross member 52 is rotatable about the lower intermediate axis K. An inner ring of the bearing is disposed at the outer periphery of the penetration portion 211a. An outer ring of the bearing is disposed on the lower cross member 52.

The roll actuator 40 is supported on the body frame 21 through the stay 42 fixed to a front portion of the penetration portion 211a. The stay 42 extends along the lower intermediate axis K below the lower cross member 52 and is coupled to a lower portion of the head pipe 211. Thus, even when the vehicle 1 leans, the roll actuator 40 is not displaced relative to the body frame 21. When the vehicle 1 leans, the roll actuator 40 is displaced relative to the upper cross member 51, the lower cross member 52, the left side member 53, the right side member 54, the left buffer device 33, the right buffer device 34, the left front wheel 31, and the right front wheel 32. The stay 42 is fixed to a casing 41 of the roll actuator 40 at a plurality of locations.

As illustrated in FIG. 4, the left buffer device 33 is a so-called telescopic buffer device. The left buffer device 33 includes a left outer element 35 and a left inner element 36 that can be displaced relative to each other along a left extension axis c extending in the top-bottom direction of the body frame 21. The illustrated left buffer device 33 is a telescopic buffer device of an upright type in which the upper end of the left inner element 36 is located above the upper end of the left outer element 35.

Although not shown, the right buffer device 34 includes a right outer element and a right inner element that can be displaced from each other along a right extension axis extending in the top-bottom direction of the body frame 21. The right buffer device 34 and the left buffer device 33 are symmetric in the left-right direction. Thus, detailed description of the right buffer device 34 will not be repeated.

As illustrated in FIG. 4, the left outer element 35 includes a left front outer tube 35a and a left rear outer tube 35b disposed behind the left front outer tube 35a. The left inner element 36 includes a left front inner tube 36a and a left rear inner tube 36b disposed behind the left front inner tube 36a.

Although not shown, the right outer element includes a right front outer tube and a right rear outer tube disposed behind the right front outer tube. The right inner element includes a right front inner tube and a right rear inner tube disposed behind the right front inner tube.

Suppose the left front outer tube 35a and the left front inner tube 36a constitute a left front telescopic element 37, and the left rear outer tube 35b and the left rear inner tube 36b constitute a left rear telescopic element 38, one of the left front telescopic element 37 and the left rear telescopic element 38 includes a damper element, and the other of the left front telescopic element 37 and the left rear telescopic element 38 does not include a damper element.

Although not shown, suppose the right front outer tube and the right front inner tube constitute a right front telescopic element, and the right rear outer tube and the right rear inner tube constitute a right front telescopic element, one of the right front telescopic element and the right rear telescopic element includes a damper element, and the other of the right front telescopic element and the right rear telescopic element does not include a damper element.

Figure 5:
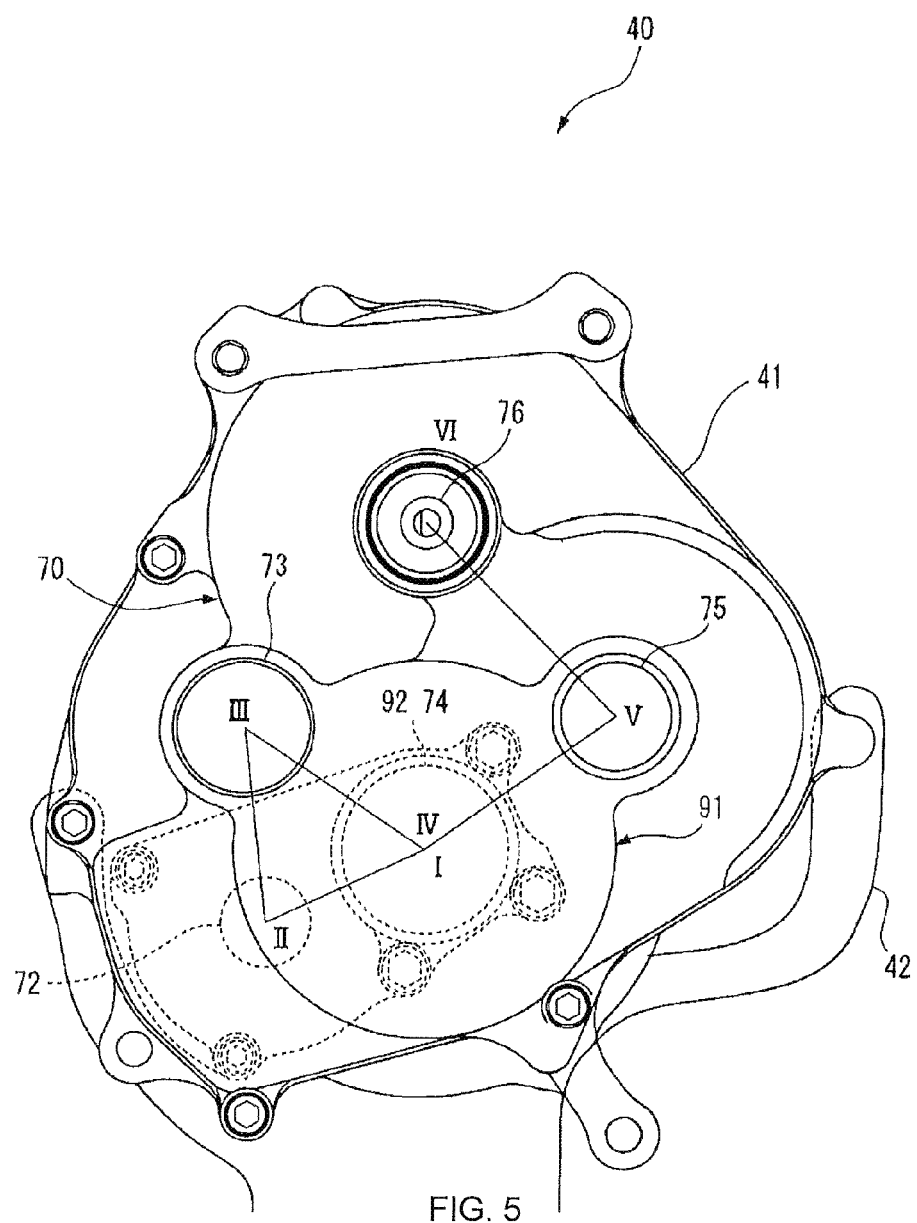
FIG. 5 is a backside view illustrating a roll actuator.

FIG. 5 is a back side view of the roll actuator 40. FIG. 5 is a view of the roll actuator 40 seen from the linkage mechanism 5. As illustrated in FIG. 5, the roll actuator 40 includes the casing 41, an electric motor 91, and a speed reduction mechanism 70. The electric motor 91 and the speed reduction mechanism 70 are disposed inside the casing 41. In this embodiment, an output of the electric motor 91 is transferred to the upper cross member 51 through the speed reduction mechanism 70 (see FIG. 4).

The speed reduction mechanism 70 includes five reduction shafts 72 through 76. The speed reduction mechanism 70 includes a second reduction shaft 72, a third reduction shaft 73, a fourth reduction shaft 74, a fifth reduction shaft 75, and a sixth reduction shaft 76. The second reduction shaft 72, the third reduction shaft 73, the fourth reduction shaft 74, the fifth reduction shaft 75, and the sixth reduction shaft 76 are supported on the casing 41 with a bearing interposed therebetween. The second reduction shaft 72, the third reduction shaft 73, the fourth reduction shaft 74, the fifth reduction shaft 75, and the sixth reduction shaft 76 are individually rotatable about the reduction axes with respect to the casing 41.

An output shaft 92 rotates about a first reduction axis I. The second reduction shaft 72 rotates about a second reduction axis II. The third reduction shaft 73 rotates about a third reduction axis III. The fourth reduction shaft 74 rotates about a fourth reduction axis IV. The fifth reduction shaft 75 rotates about a fifth reduction axis V. The sixth reduction shaft 76 is fixed to the upper cross member 51 in a relative non-rotatable manner. When the sixth reduction shaft 76 rotates, the upper cross member 51 also rotates. The sixth reduction shaft 76 rotates about a sixth reduction axis VI.

Rotation of the electric motor 91 is transferred to the second reduction shaft 72 through meshing between predetermined gears.

Rotation of the second reduction shaft 72 is transferred to the third reduction shaft 73 through meshing between predetermined gears.

Rotation of the third reduction shaft 73 is transferred to the fourth reduction shaft 74 through meshing between predetermined gears.

Rotation of the fourth reduction shaft 74 is transferred to the fifth reduction shaft 75 through meshing between predetermined gears.

Rotation of the fifth reduction shaft 75 is transferred to the sixth reduction shaft 76 through meshing between predetermined gears.

As illustrated in FIG. 5, the first reduction axis I of the output shaft 92 of the electric motor 91 coincides with the fourth reduction axis IV of the fourth reduction shaft 74. The output shaft 92 is a hollow member. A front portion of the fourth reduction shaft 74 is rotatably inserted in the hollow output shaft 92. The output shaft 92 of the electric motor 91 does not mesh directly with the fourth reduction shaft 74, and as described above, rotation of the output shaft 92 of the electric motor 91 is transferred to the fourth reduction shaft 74 through the second reduction shaft 72 and the third reduction shaft 73.

In this manner, a rotation axis of at least one of the output shaft 92 of the electric motor 91, the second reduction shaft 72, the third reduction shaft 73, the fourth reduction shaft 74, the fifth reduction shaft 75, or the sixth reduction shaft 76 is disposed to coincide with a rotation axis of another.

(Vehicle According to Other Embodiments)

Figure 6:
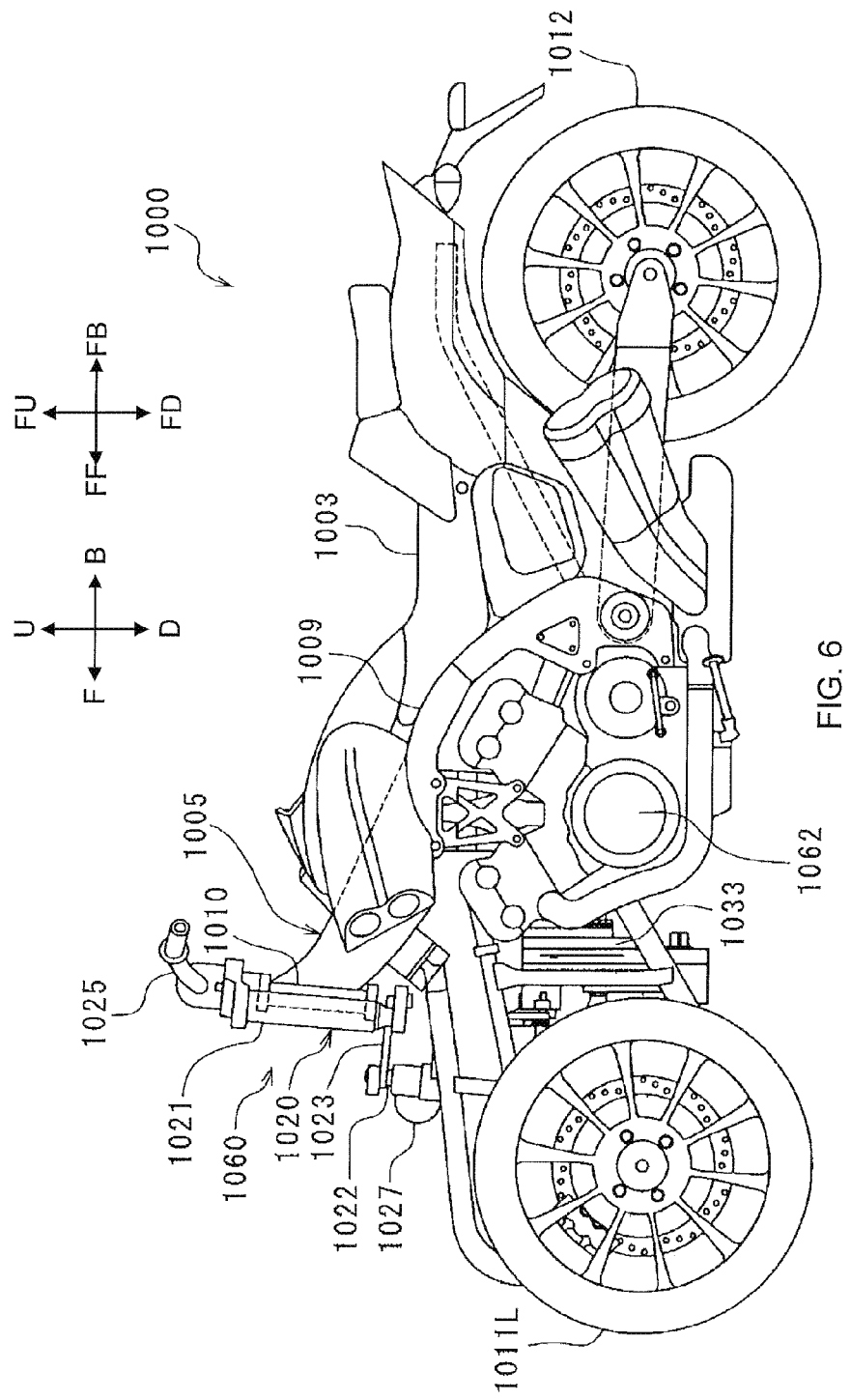
FIG. 6 is a left side view of a straddled vehicle according to one embodiment of the present teaching.
Figure 7A:
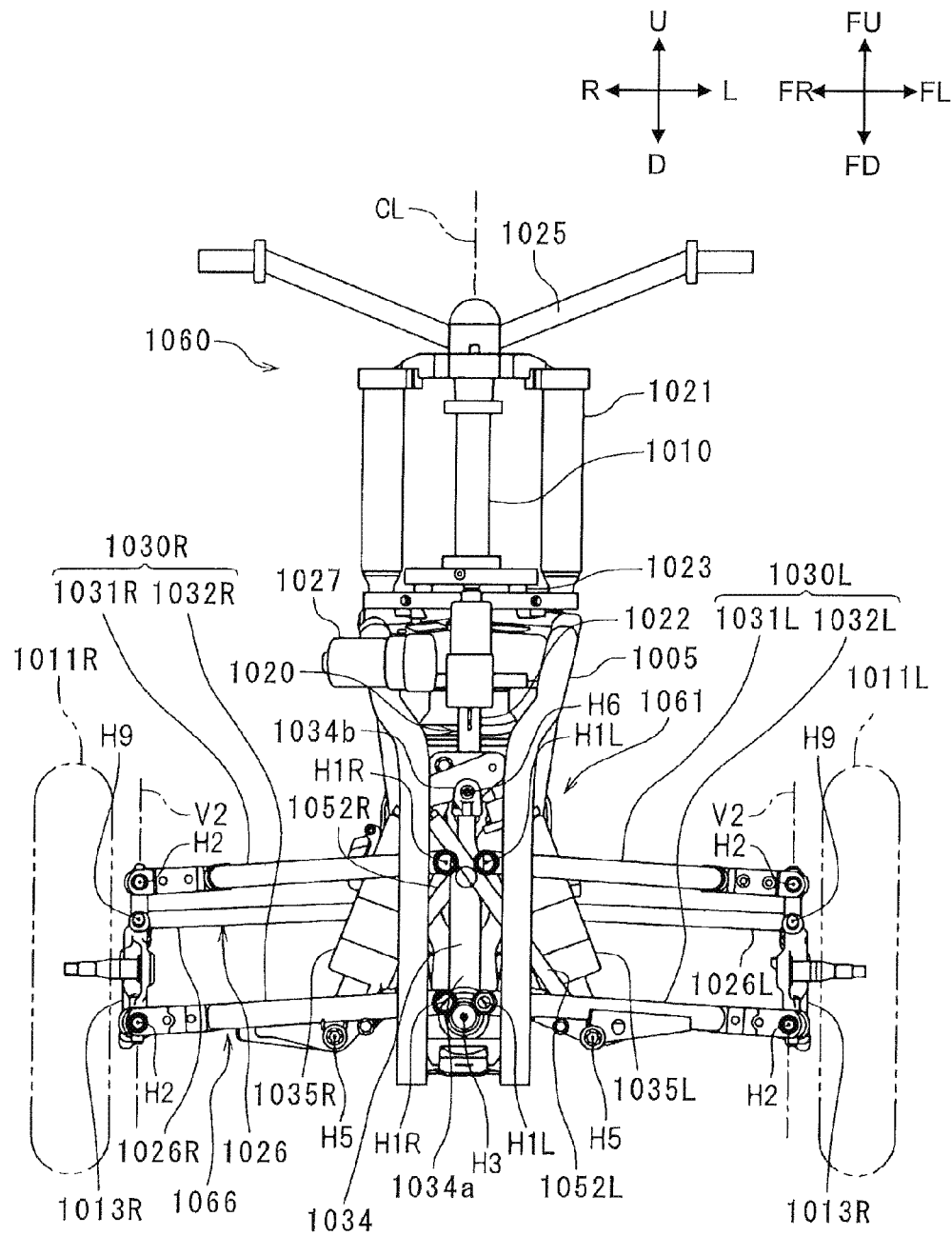
FIG. 7A is a front view of a portion of the straddled vehicle when a body frame is in an upright position.
Figure 7B:
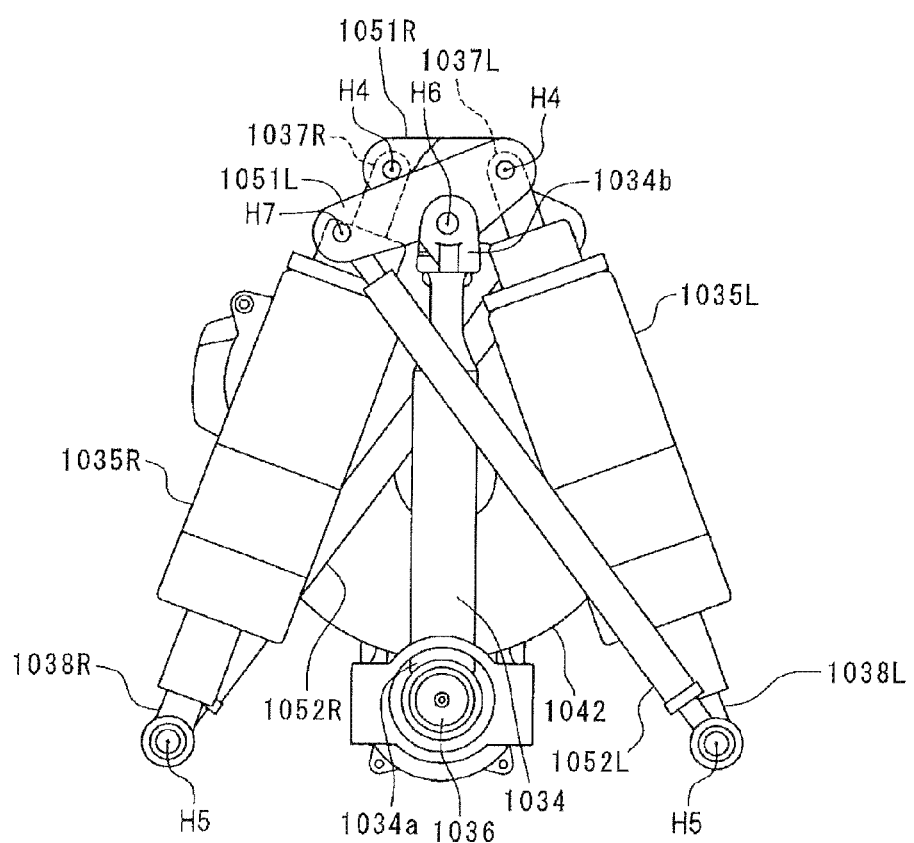
FIG. 7B is a front view of a portion of a suspension.

A vehicle according to another embodiment will now be described with reference to FIGS. 6 through 9. As illustrated in FIGS. 6, 7A, and 7B, a straddled vehicle according to this embodiment is a straddled three-wheeled vehicle (hereinafter simply referred to as a vehicle) 1000 including two front wheels 1011L and 1011R and one rear wheel 1012. A tread width between the two front wheels is 460 mm or more.

As illustrated in FIGS. 6 and 7, the vehicle 1000 includes a body frame 1005, a left front wheel 1011L, a right front wheel 1011R, a rear wheel 1012, a steering mechanism 1060 for steering the left front wheel 1011L and the right front wheel 1011R, a suspension 1061 supporting the left front wheel 1011L and the right front wheel 1011R and configured to lean the left front wheel 1011L and the right front wheel 1011R in accordance with a lean of the body frame 1005, a seat 1003 on which a rider is seated, and a power unit 1062 for generating a driving force for driving the rear wheel 1012.

As illustrated in FIG. 6, the body frame 5 includes a head pipe 1010 and a main frame 1009 extending rearward from the head pipe 1010 in a vehicle side view. The head pipe 1010 extends obliquely rearward and upward in the vehicle side view. As illustrated in FIG. 7A, the head pipe 1010 extends in the top-bottom direction in a vehicle front view.

The power unit 1062 is not limited to a specific configuration. The power unit 1062 may include an internal combustion engine or an electric motor, for example.

The suspension 1061 is a double wishbone suspension. The suspension 1061 includes a left support arm 1030L supporting the left front wheel 1011L, a right support arm 1030R supporting the right front wheel 1011R, a center arm 1034, a left cushion unit 1035L, and a right cushion unit 1035R. The left support arm 1030L and the right support arm 1030R constitute a linkage mechanism 1066 that changes relative positions of the left front wheel 1011L and the right front wheel 1011R in the top-bottom direction of the body frame 1005 in accordance with a lean of the body frame 1005. The center arm 1034 is an arm that is supported on the body frame 1005 to be swingable about an axis extending in the front-rear direction of the body frame 1005, transfers upward motion of the left front wheel 1011L as downward motion of the right front wheel 1011R, and transfers upward motion of the right front wheel 1011R as downward motion of the left front wheel 1011L.

The left support arm 1030L includes a left lower arm 1032L and a left upper arm 1031L disposed above the left lower arm 1032L. The left lower arm 1032L and the left upper arm 1031L are disposed at the left of a vehicle center line CL. The "vehicle center line CL" refers to a line intersecting a center axis of the head pipe 1010 and extending in the front-rear direction of the body frame 1005. As illustrated in FIG. 7A, the right ends of the left lower arm 1032L and the left upper arm 1031L are supported on the body frame 1005 to be swingable upward or downward about a first left axis H1L extending in the front-rear direction of the body frame 1005. The left ends of the left lower arm 1032L and the left upper arm 1031L are supported on a left knuckle arm 1013L to be swingable upward and downward about a second left axis H2 extending in the front-rear direction of the body frame 1005.

The right support arm 1030R includes a right lower arm 1032R and a right upper arm 1031R disposed above the right lower arm 1032R. The right lower arm 1032R and the right upper arm 1031R are disposed at the right of the vehicle center line CL. As illustrated in FIG. 7A, the left ends of the right lower arm 1032R and the right upper arm 1031R are supported on the body frame 1005 to be swingable upward and downward about a first right axis H1R extending in the front-rear direction of the body frame 1005. The right ends of the right lower arm 1032R and the right upper arm 1031R are supported on a right knuckle arm 1013R to be swingable upward and downward about a second right axis H2 extending in the front-rear direction of the body frame 1005.

The left front wheel 11L is disposed at the left of the vehicle center line CL and is rotatably supported on the left knuckle arm 1013L. The right front wheel 1011R is disposed at the right of the vehicle center line CL and is rotatably supported on the right knuckle arm 1013R.

The center arm 1034 has a plate shape extending in the top-bottom direction. The center arm 1034, however, is not limited to a specific shape. A lower end 1034a of the center arm 1034 is supported on the body frame 1005 to be swingable about an axis H3 extending in the front-rear direction of the body frame 1005. A first left arm 1051L and a first right arm 1051R are supported on an upper end 1034b of the center arm 1034 to be swingable about an axis H6 extending in the front-rear direction of the body frame 1005.

The first left arm 1051L is coupled to the second left arm 1052L, and the first right arm 1051R is coupled to the second right arm 1052R. The second left arm 1052L and the second right arm 1052R have rod shapes. As illustrated in FIG. 7B, the upper end of the second left arm 1052L is supported on the first left arm 1051L to be swingable about an axis H7 extending in the front-rear direction of the body frame 1005. The lower end of the second left arm 1052L is supported on the left lower arm 1032L of the left support arm 1030L to be swingable about an axis H5 extending in the front-rear direction of the body frame 1005. The upper end of the second right arm 1052R is supported on the first right arm 1051R to be swingable about the axis H7 extending in the front-rear direction of the body frame 1005. The lower end of the second right arm 1052R is supported on the right lower arm 1032R of the right support arm 1030R to be swingable about the axis H5 extending in the front-rear direction of the body frame 1005.

As illustrated in FIG. 7B, the left cushion unit 1035L includes a first end 1038L and a second end 1037L. The first end 1038L is supported on the left lower arm 1032L of the left support arm 1030L to be swingable about the axis H5 extending in the front-rear direction of the body frame 1005. The second end 1037L is supported on the first left arm 1051L to be swingable about an axis H4 extending in the front-rear direction of the body frame 1005.

The right cushion unit 1035R includes a first end 1038R and a second end 1037R. The first end 1038R is supported on the right lower arm 1032R of the right support arm 1030R to be swingable about the axis H5 extending in the front-rear direction of the body frame 1005. The second end 1037R is supported on the first right arm 1051R to be swingable about the axis H4 extending in the front-rear direction of the body frame 1005.

The steering mechanism 1060 includes a steering shaft 1020 rotatably supported on the head pipe 1010, a handle bar 1025 fixed to the steering shaft 1020, and a tie rod 1026 coupling the steering shaft 1020 to the left front wheel 1011L and the right front wheel 1011R.

The steering shaft 1020 includes a first steering shaft 1021 rotatably supported on the head pipe 1010, a second steering shaft 1022 disposed ahead of the first steering shaft 1021 in the front-rear direction of the body frame 1005, and a coupling arm 1023 coupling the first steering shaft 1021 and the second steering shaft 1022 to each other.

The tie rod 1026 includes a left tie rod 1026L coupling the second steering shaft 1022 and the left front wheel 1011L to each other and a right tie rod 1026R coupling the second steering shaft 1022 and the right front wheel 1011R to each other.

As illustrated in FIG. 7A, the left end of the left tie rod 1026L is supported on the left knuckle arm 1013L to be swingable about an axis V2 extending in the top-bottom direction of the body frame 1005 and about an axis H9 extending in the front-rear direction of the body frame 1005. The right end of the right tie rod 1026R is supported on the right knuckle arm 1013R to be swingable about the axis V2 extending in the top-bottom direction of the body frame 1005 and about the axis H9 extending in the front-rear direction of the body frame 1005.

The steering mechanism 1060 also includes an actuator 1027 for applying a rotary force to the steering shaft 1020. The actuator 1027 is attached to the steering shaft 1020. The actuator 1027 serves as a support for steering by a rider.

The vehicle 1 includes a roll actuator 1033 that generates a driving force for leaning the body frame 1005. The roll actuator 1033 applies a rotary force about the first left axis H1L to the left support arm 1030L and applies a rotary force about the first right axis H1R to the right support arm 1030R to thereby change relative positions of the left front wheel 1011L and the right front wheel 1011R in the top-bottom direction of the body frame 1005 in accordance with a lean of the body frame 1005.

Figure 8:
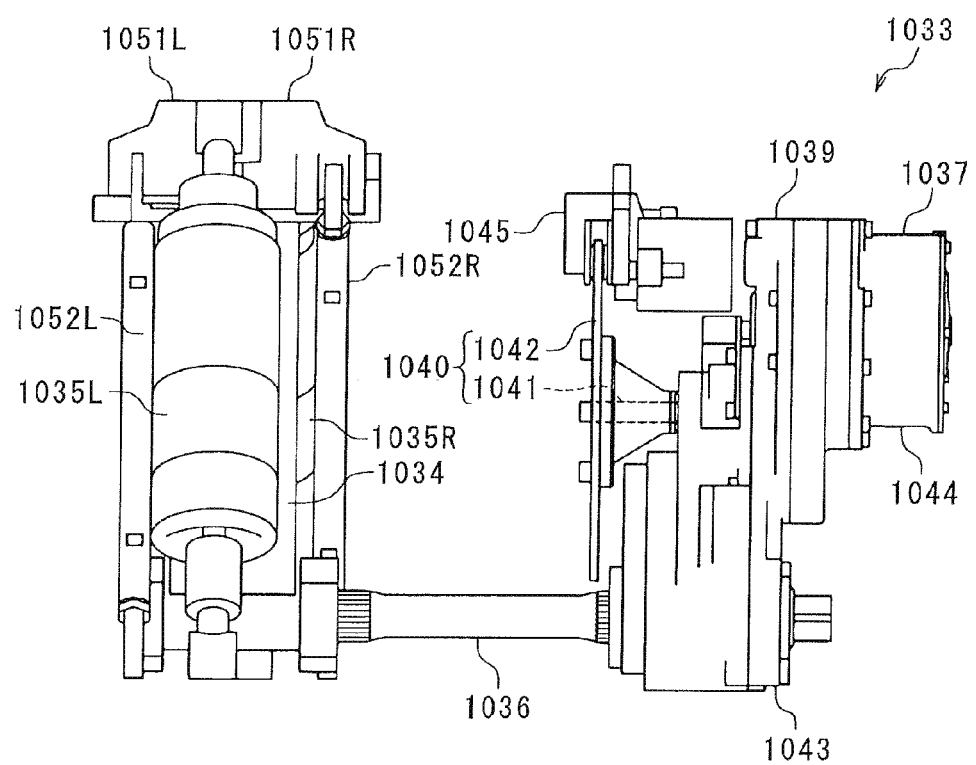
FIG. 8 is a side view of the actuator and a portion of the suspension.
Figure 9:
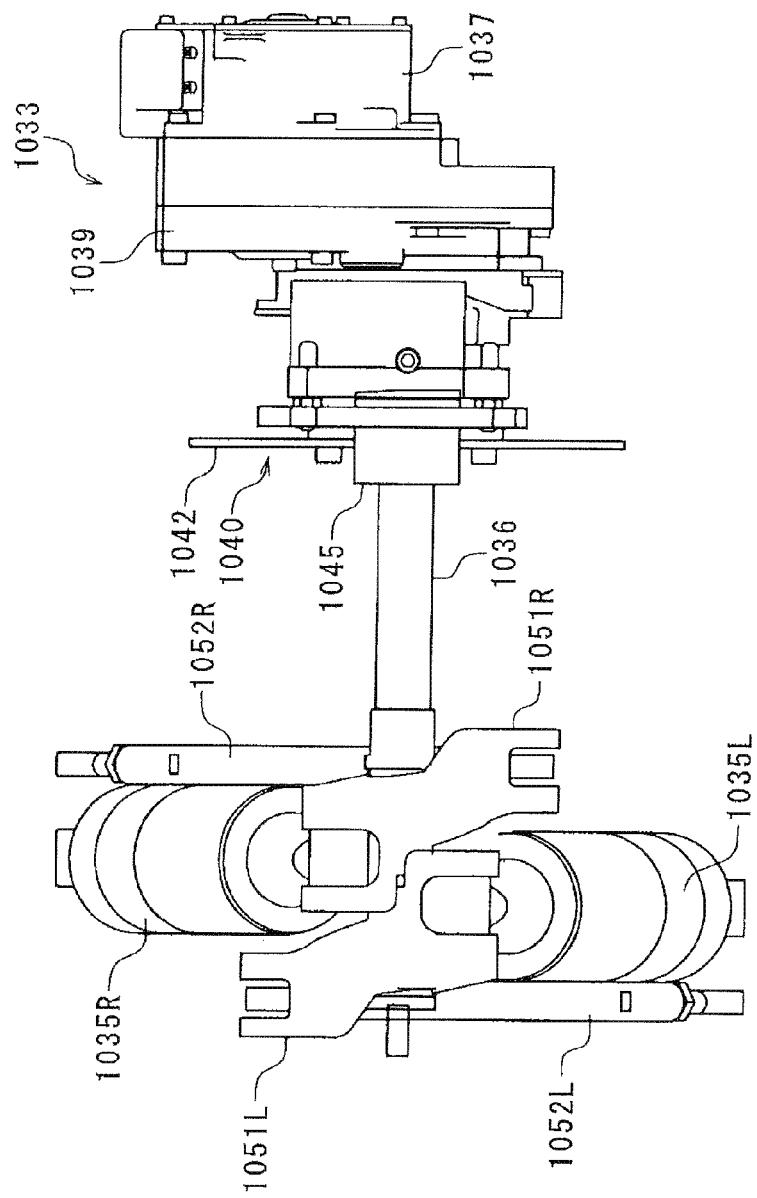
FIG. 9 is a plan view of the actuator and a portion of the suspension.

As illustrated in FIGS. 8 and 9, the roll actuator 1033 includes a motor 1037, a speed reduction mechanism 1039 that reduces the rotation speed of the motor 1037, and a brake member 1040 that restricts rotation of the motor 1037. The roll actuator 1033 is coupled to a coupling shaft 1036. The motor 1037, the speed reduction mechanism 1039, and the brake member 1040 are integrated. The coupling shaft 1036 extends forward from the roll actuator 1033 in the front-rear direction of the body frame 1005, and is coupled to the center arm 1034. The brake member 1040 includes a brake shaft 1041 coupled to the speed reduction mechanism 1039, and a brake disc 1042 fixed to the brake shaft 1041. The body frame 1005 supports a brake caliper 1045 that restricts rotation of the motor 1037 by holding the brake disc 1042. The motor 1037 includes a motor case 1044, a stator and a rotor disposed inside the motor case 1044, and a motor shaft fixed to the rotor. The speed reduction mechanism 1039 includes a gear case 1043 and a reduction gear disposed inside the gear case 1043.

(Description of Vehicle Behavior in ABS Actuation)

Next, with reference to FIG. 10, a behavior of the vehicle in ABS actuation in the absence of control by a posture control device 20 according to this embodiment will be described. The road surface on the right front wheel has a friction coefficient µ higher than a friction coefficient µ of the road surface on the left front wheel. The right portion of FIG. 10 illustrates the vehicle when seen from above, and the left portion of FIG. 10 illustrates the vehicle when seen from the front. In the drawing, R represents the front right wheel, and L represents the front left wheel. It is assumed that the vehicle moves from the top to the bottom on the drawing sheet of FIG. 10. The roll actuator (also referred to as a lean actuator) is an actuator that performs posture control relative to a left lean direction and a right lean direction, such as upright posture assistance and turning leaning posture assistance.

(a) A brake operation is performed on the front wheels. Braking forces are exerted on the right front wheel and the left front wheel. The braking forces of the right front wheel and the left front wheel to the road surfaces are indicated by arrows.

(b) An ABS is actuated. At this time, since the friction coefficients µ of the road surfaces respectively contacting the left and right wheels are different from each other, a braking force difference (right braking force>left braking force) occurs, and a right turning force is generated. In sections (b), (d), (f), (h), and (j) of FIG. 10, differences in braking force are represented as the lengths (long or short) of arrows.

(c) The generation of the right turning force causes a centrifugal force so that the vehicle body leans leftward.

(d) The left lean causes left steering. This steering is due to self-steering.

(e) The roll actuator generates a roll torque (lean torque) in a direction in which the vehicle body is raised, that is, the vehicle body is leaned rightward. The vehicle body is raised by actuation of the roll actuator (by posture control). A roll torque of the roll actuator generates a reaction force, and a tire load on the left front wheel increases. In sections (e), (f), and (i) of FIG. 10, differences in tire load are represented as the lengths (long or short) of arrows.

(f) The tire load on the left front wheel increases and a tire load on the right front wheel decreases so that a tire load difference occurs. This tire load difference causes a braking force difference (right braking force<left braking force) between a braking force of the left front wheel on the road surface and a braking force of the right front wheel on the road surface. The left braking force becomes larger than the right braking force. This braking force difference generates a left turning force (yaw moment).

(g) The generation of the left turning force causes a centrifugal force so that the vehicle body leans rightward.

(h) The right lean causes right steering. This steering is due to self-steering.

(i) The roll actuator generates a roll torque (lean torque) in a direction in which the vehicle body is raised, that is, the vehicle body is leaned leftward. The vehicle body is raised by actuation of the roll actuator (by posture control). A roll torque of the roll actuator generates a reaction force, and a tire load on the right front wheel increases.

(j) The tire load on the right front wheel increases and the tire load on the left front wheel decreases so that a tire load difference occurs. This tire load difference causes a braking force difference (right braking force>left braking force) between a braking force of the left front wheel on the road surface and a braking force of the right front wheel on the road surface. The right braking force becomes larger than the left braking force, and this braking force difference causes a right turning force.

The operation returns to section (c), and the behavior described above is repeated until the vehicle stops.

(Description of Functional Block)

Figure 11:
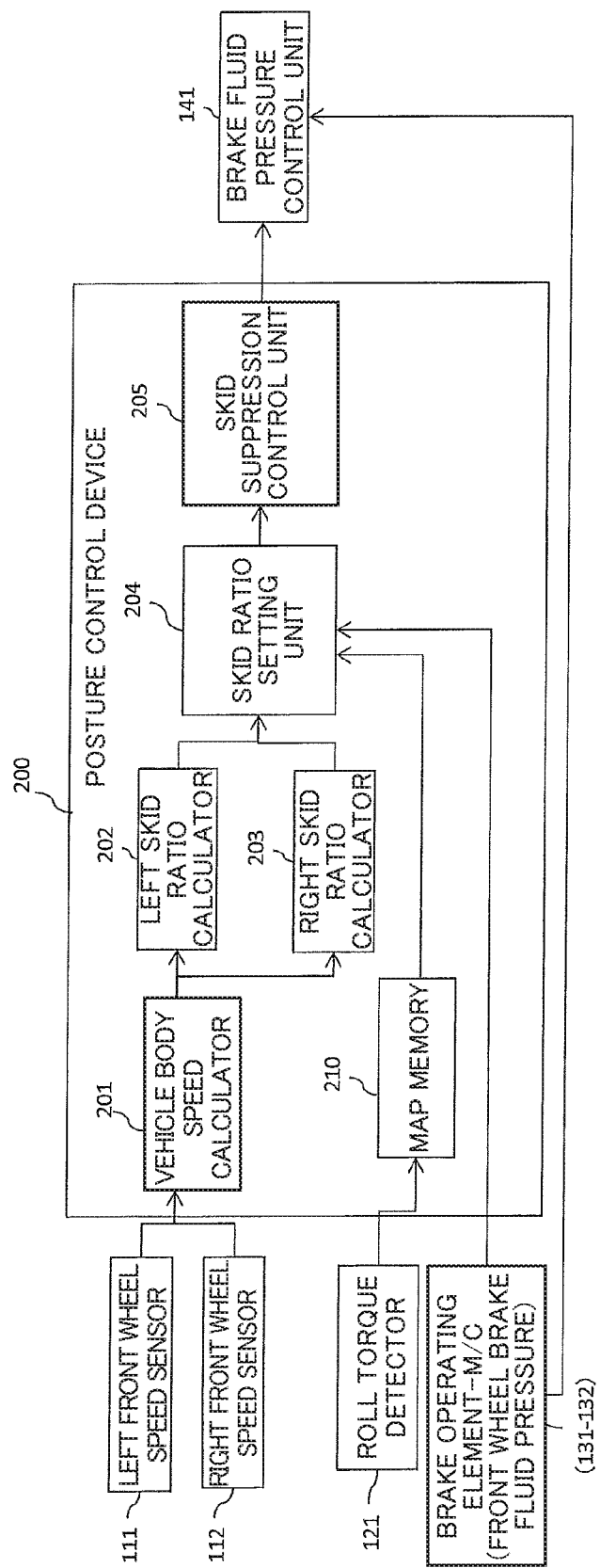
FIG. 11 is a functional block diagram of a straddled vehicle according to a first embodiment.

Description will now be given with reference to FIG. 11. The posture control device 200 controls a behavior of the vehicle. A roll torque detector 121 detects a roll torque of the roll actuator. The roll torque detected by the roll torque detector 121 may be an instruction value or a current value to the electric motor in a case where the roll actuator is an electric motor actuator, may be a hydraulic value (sensor detection value) in a case where the roll actuator is a hydraulic actuator, or may be obtained from a load variation amount of each of the left and right steering wheels. The posture control device 200 includes a controller, including processor and memory, that is connected to one or more sensors, either via wires or wirelessly, performs calculations based on data received from the sensors, as discussed in the description that follows, and generates control signals based on the calculations performed to control a vehicle in a particular way according to embodiments of the invention. Specifically, according to one embodiment, the posture control device 200 controls a brake pressure applied to one or more wheels of a vehicle.

A left front wheel speed sensor 111 detects a left front wheel speed. A right front wheel speed sensor 112 detects a right front wheel speed.

A vehicle body speed calculator 201 calculates a vehicle body speed based on at least one of (based on all or a part of) a longitudinal acceleration, a wheel speed, a left wheel speed, or a right wheel speed. In this embodiment, the vehicle body speed calculator 201 calculates the vehicle body speed based on the longitudinal acceleration, the left wheel speed, and the right wheel speed. The left front wheel speed can be provided from the left front wheel speed sensor 111. The right front wheel speed can be provided from the right wheel speed sensor 112. The longitudinal acceleration can be provided from a longitudinal acceleration sensor (not shown) for detecting the longitudinal acceleration.

A rider operates a front wheel brake operating element 131, and in accordance with this operation, a fluid pressure is sent from a master cylinder 132 to a brake caliper (corresponding to left and right brake units) for each wheel through a fluid pressure circuit so that a braking force on each wheel is generated. A signal from a fluid pressure detector for detecting a fluid pressure of the master cylinder 132 or a signal from a stroke detector for detecting a stroke when the front wheel brake operating element 131 is operated is sent to a skid ratio setting unit 204.

A left skid ratio calculator 202 calculates a left calculated skid ratio based on the vehicle body speed obtained by the vehicle body speed calculator 201 and the left front wheel speed obtained by the left front wheel speed sensor 111.

The left calculated skid ratio can be calculated as follows:

left calculated skid ratio=(vehicle body speed−left front wheel speed)÷vehicle body speed×100%

A right skid ratio calculator 203 calculates a right calculated skid ratio based on the vehicle body speed obtained by the vehicle body speed calculator 201 and the right front wheel speed obtained by the right wheel speed sensor 112.

The right calculated skid ratio can be calculated as follows:

right calculated skid ratio=(vehicle body speed−right front wheel speed)÷vehicle body speed×100%

Figure 13:
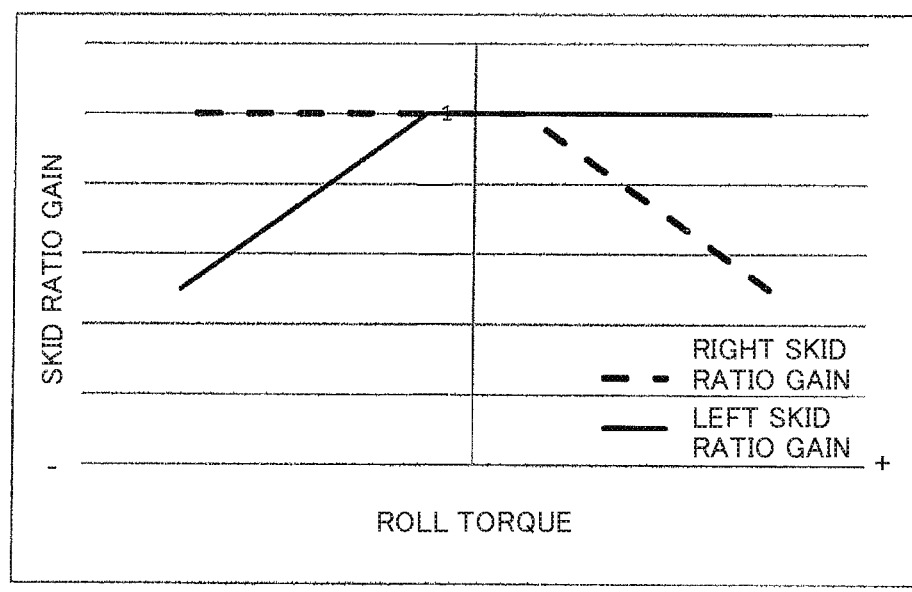
FIG. 13 is an example of a roll torque-skid ratio gain map.

A map memory 210 holds a left-right roll torque-skid ratio gain map. FIG. 13 shows an example of a left-right roll torque-skid ratio gain map. In FIG. 13, the "+" direction from 0 (zero) to the right represents a direction in which a roll torque in a direction in which the body frame is leaned leftward increases. The "−" direction from 0 (zero) to the left represents a direction in which a roll torque in which the vehicle body is leaned rightward increases. In FIG. 13, in the left-right roll torque-skid ratio gain map, in the course of an increase in a roll torque in a direction in which a load on the right front wheel increases (the range from 0 to the right), when the amount of increase in the roll torque exceeds a threshold, a right skid ratio gain is reduced. At this time, a left skid ratio gain is not changed. That is, the skid ratio of the right front wheel whose load has increased is reduced. The roll torque in the direction in which the load on the right front wheel increases is a roll torque in the direction in which the body frame is leaned leftward. Here, the roll torque in the direction in which the body frame is leaned leftward includes a roll torque in a direction in which the body frame leaned rightward is raised to the upright position.

On the other hand, in the course of an increase in the roll torque in a direction in which the load on the left front wheel increases (the range from 0 to the left), when the amount of increase in the roll torque exceeds a threshold, the left skid ratio gain is reduced. At this time, the right skid ratio gain is not changed. That is, the skid ratio of the left front wheel whose load has increased is reduced. The roll torque in the direction in which the load on the left front wheel increases is a roll torque in the direction in which the body frame is leaned to the right. Here, the roll torque in the direction in which the body frame is leaned to the right includes a roll torque in a direction in which the body frame leaned to the left is raised to the upright position.

As another embodiment, in the left-right roll torque-skid ratio gain map, the right skid ratio gain may be reduced irrespective of the threshold in proportion to an increase in the roll torque on the right front wheel, or the left skid ratio gain may be reduced irrespective of the threshold in proportion to an increase in the roll torque on the left front wheel.

First, while a signal from the fluid pressure detector for detecting a fluid pressure of the master cylinder 132 or a signal from the stroke detector for detecting a stroke when the front wheel brake operating element 131 is operated is received or while the reception of the signal continues, the skid ratio setting unit 204 performs the following process.

Based on the roll torque detected by the roll torque detector 121, the skid ratio setting unit 204 obtains a left skid ratio gain from the left-right roll torque-skid ratio gain map, and multiplies the left skid ratio gain by the left calculated skid ratio, thereby setting a left target skid ratio. The left target skid ratio can be, for example, calculated as follows: left target skid ratio=left skid ratio gain×left calculated skid ratio Based on the roll torque detected by the roll torque detector 121, the skid ratio setting unit 204 obtains a right skid ratio gain from the left-right roll torque-skid ratio gain map, and multiplies the right skid ratio gain by the right calculated skid ratio, thereby setting a right target skid ratio. The right target skid ratio can be, for example, calculated as follows: right target skid ratio=right skid ratio gain×right calculated skid ratio A skid suppression control unit 205 controls brake fluid pressures on the left and right front wheels based on the left target skid ratio and the right target skid ratio set by the skid ratio setting unit 204. In this embodiment, brake fluid pressures on the wheels calculated based on the left target skid ratio and the right target skid ratio are instructed to a brake fluid pressure control unit 141, and the brake fluid pressure control unit 141 performs brake fluid pressure control based on the instruction.

(Description of Process Flow)

Figure 12:
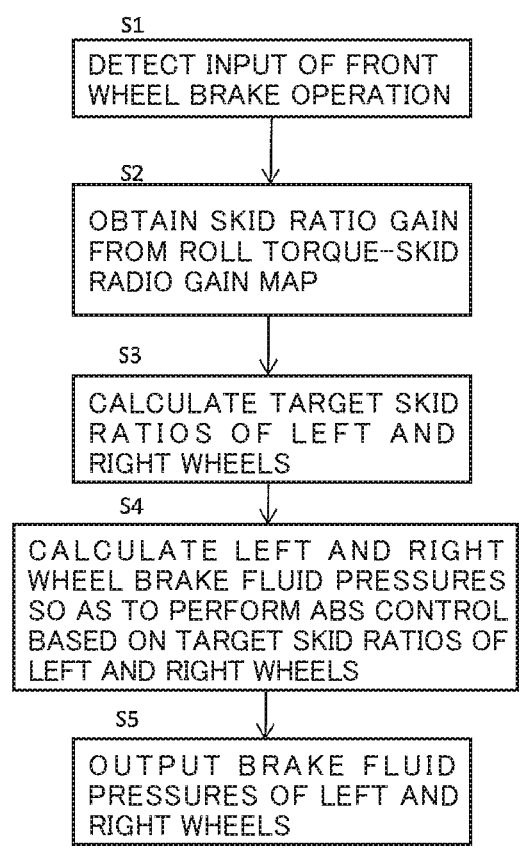
FIG. 12 is a flowchart depicting a process of the straddled vehicle according to the first embodiment.

A process flow of this embodiment will be described with reference to FIG. 12. As one example, in a case where a brake operation by a rider is input in a situation where the road surfaces on which the left and right front wheels contact have different friction coefficients μ, the following process is performed.

(1) In step S1, a brake operation input to the front wheels is detected.
(2) In step S2, left and right skid ratio gains in accordance with roll torques are obtained from the roll torque-skid ratio gain map.
(3) In step S3, target skid ratios for the left and right wheels are calculated.
(4) In step S4, brake fluid pressures on the left and right wheels are calculated so as to perform ABS control based on the target skid ratios of the left and right wheels.
(5) In step S5, the brake fluid pressures on the left and right wheels are output so that braking forces are generated for the wheels.

Through the foregoing process, the behavior of the vehicle in which left and right leans are repeatedly performed described with reference to FIG. 10 can be quickly finished.

(Brake Test)

A simulation was conducted on the vehicle according to the first embodiment in the following conditions.
(1) The friction coefficient μ of the road surface on the right front wheel was 1.0, the friction coefficient μ of the road surface on the left front wheel was 0.45, and the friction coefficient μ on the road surface on the rear wheel was 1.0.
(2) In Example 1, the posture control device 200 according to the first embodiment was actuated, and the posture control device 200 was not actuated in a configuration without lean control in Comparative Example 1 and in a configuration with lean control in Comparative Example 2.

Figure 14:
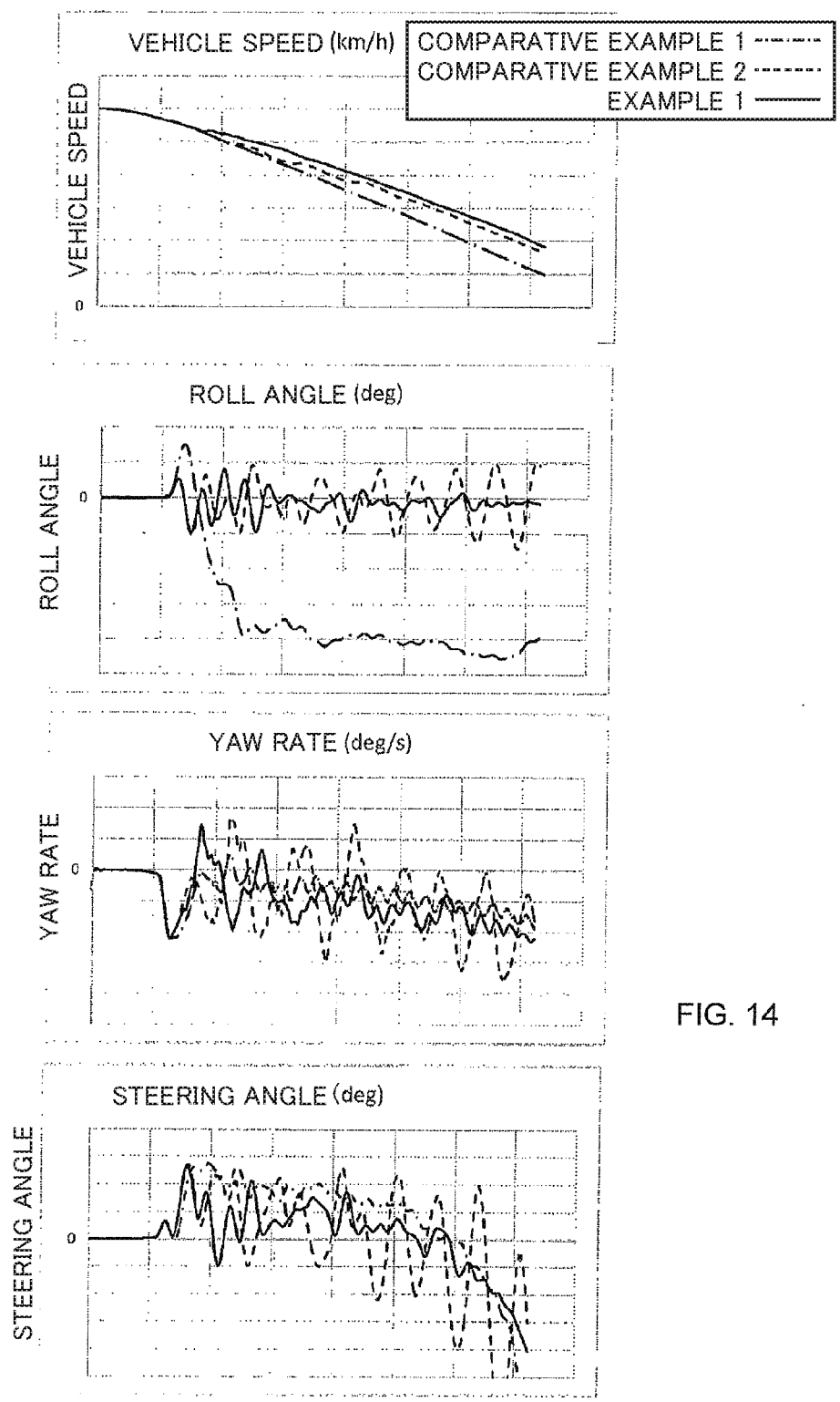
FIG. 14 illustrates graphs showing results of brake tests.

In the vehicle speed graph (top graph) in FIG. 14, each vehicle body speed gradually decreases, and this shows that the vehicle is stopping.

In the roll angle graph (the second graph from the top) in FIG. 14, the roll angle decreases in one way in Comparative Example 1 (dash-dotted broken line), and this shows that the vehicle leans in one way. In Comparative Example 2 (broken line), the roll angle represents a waveform, and this shows that the vehicle leans leftward and rightward alternately. That is, a behavior in FIG. 10 is shown. On the other hand, Example 1 (solid line) shows substantially the same waveform as that in Comparative Example 2 in an initial stage, but the height of the amplitude of the waveform gradually decreases, and the degree of lean of the vehicle to the left and to the right alternately gradually decreases.

The yaw rate graph (the third graph from the top) in FIG. 14 shows that the heights of amplitudes of the waveforms in Example 1 and Comparative Example 1 are substantially the same, but the height of the amplitude of the waveform in Comparative Example 2 is larger than those in Example 1 and Comparative Example 1.

The steering angle graph (the bottom graph) in FIG. 14 shows that the waveform of Example 1 gradually decreases, but the waveform of Comparative Example 2 does not decrease and gradually increases.

From those graphs, it is shown that in Example 1, control of suppressing a behavior of alternately leaning the vehicle leftward and rightward can be performed by changing the skid ratio in accordance with the roll torque (by reducing the slid ratio of the wheel on which a heavier load is applied), as compared to Comparative Example 2 in which such a change is not performed.

Second Embodiment

A straddled vehicle according to a second embodiment further includes a rotation angle detector for detecting a rotation angle of the roll actuator. The skid ratio setting unit 204 sets a left target skid ratio and a right target skid ratio based on a roll torque detected by the roll torque detector 121 and a rotation angle detected by the rotation angle detector.

The map memory 210 stores a correction map of rotation angle-roll torque.

The skid ratio setting unit 204 obtains a correction value in accordance with a rotation angle from the rotation angle-roll torque correction map, and multiplies a roll torque by the correction value, thereby calculating a corrected roll torque. Based on the corrected roll torque, the skid ratio setting unit 240 obtains left and right skid ratio gains from the left-right roll torque-skid ratio gain map, and multiplies the left and right skid ratio gains by the left and right calculated skid ratios, thereby setting left and right target skid ratios.

The skid suppression control unit 205 controls brake fluid pressures on the left and right wheels in accordance with the left and right target skid ratios.

In the second embodiment, it is possible to correct a mechanical loss and non-linearity due to a lean of the vehicle or deformation of the lean mechanism because of a slope of a road surface.

Third Embodiment

A straddled vehicle according to a third embodiment further includes a lean detector (gyro sensor) that detects a lean state (roll angle) of the vehicle body and a roll angle estimation unit that estimates a vehicle body roll angle based on the detected roll angle, in addition to the configuration of the first embodiment. The skid ratio setting unit 204 sets a left target skid ratio and a right target skid ratio, based on a roll torque detected by the roll torque detector 121 and a vehicle body roll angle.

The map memory 210 stores a correction map of a vehicle body roll angle-roll torque.

The skid ratio setting unit 204 obtains a correction value in accordance with the vehicle body roll angle from the vehicle body roll angle-roll torque correction map, and multiplies the roll torque by the correction value, thereby calculating a corrected roll torque. Thereafter, based on the corrected roll torque, the skid ratio setting unit 240 obtains left and right skid ratio gains from the left-right roll torque-skid ratio gain map, and multiplies the left and right skid ratio gains by the left and right calculated skid ratios, thereby setting left and right target skid ratios.

The skid suppression control unit 205 controls brake fluid pressures of the left and right wheels in accordance with the left and right target skid ratios.

In the third embodiment, it is possible to correct a mechanical loss and non-linearity due to a lean of the vehicle or deformation of the lean mechanism because of a slope of a road surface.

A behaviors of the vehicle according to this embodiment will be described. Anti-lock brake systems (ABSs) are mounted on some vehicles each having a relatively large tread width between left and right wheels, as described in U.S. Pat. No. 8,123,240 (Patent Document 1). In view of this, the inventor studied to find that a specific behavior occurs in the vehicle when the ABS is actuated in some situations of the road surface.

For example, when the ABS is actuated in a situation where friction coefficients µ of road surfaces respectively contacting the left and right wheels are different from each other, a posture change (roll angle) is reduced by control of the lean mechanism, but steering is shaken so that variations in the yaw direction (also referred to as "yaw variation") occurs in some cases. An example of this case is illustrated in FIG. 10. In this embodiment, when the ABS is actuated in the situation where friction coefficients µ of road surfaces respectively contacting the left and right wheels are different from each other, the behavior of the vehicle described above can be suppressed.

Figure 15A:
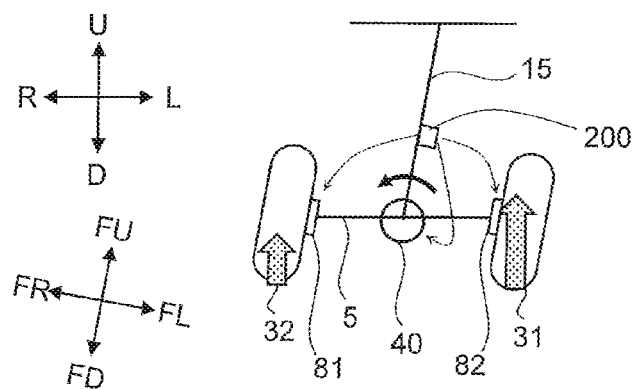
FIG. 15A illustrates control of a wheeled vehicle by a leaning posture actuator in the case of one embodiment.
Figure 15B:
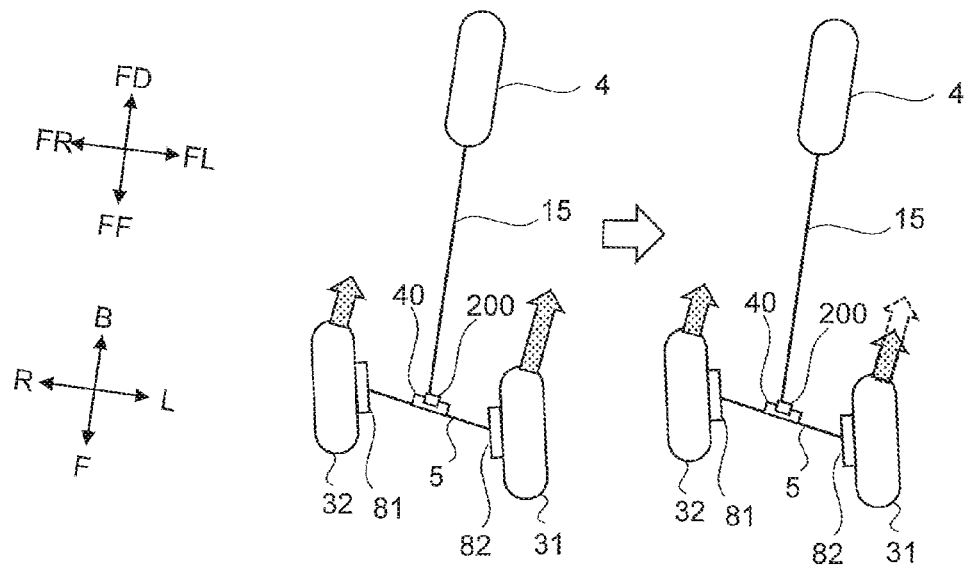
FIG. 15B illustrates control of a wheeled vehicle by a leaning posture actuator according to one embodiment.

FIGS. 15A and 15B illustrates a portion of FIG. 10 to describe control in the case of applying this embodiment. As illustrated in FIG. 15A, the leaning vehicle according to this embodiment includes a leaning body frame 21, a left inclining wheel 31, a right inclining wheel 32, another inclining wheel 4, a linkage mechanism 5, a leaning posture control actuator 40, a left inclining wheel torque applying unit 81, a right inclining wheel torque applying unit 82, and a posture control device 200 that is an integrated control device. The left inclining wheel torque applying unit 81 corresponds to the left brake unit in the example described above. The right inclining wheel torque applying unit 82 corresponds to the right brake unit in the example described above.

The posture control device 200 is an integrated control device that integrally controls the leaning posture control actuator 40, the left inclining wheel torque applying unit 81, and the right inclining wheel torque applying unit 82. This integrated control device 200 controls a left inclining wheel torque applied by the left inclining wheel torque applying unit 81 and a right inclining wheel torque applied by the right inclining wheel torque applying unit 82, based on a lean torque applied by the leaning posture control actuator 40. Alternatively, the integrated control device 200 may control a lean torque applied by the leaning posture control actuator 40, based on the left inclining wheel torque applied by the left inclining wheel torque applying unit 81 and the right inclining wheel torque applied by the right inclining wheel torque applying unit 82.

For example, in the example illustrated in FIG. 15A, the leaning posture control actuator 40 applies a lean torque in a direction in which the body frame 15 is leaned rightward, to the linkage mechanism 5. For example, to raise the body frame 15 leaned leftward to an upright position, the leaning posture control actuator 40 applies the lean torque. This lean torque increases a load on the left inclining wheel 31 and reduces a load on the right inclining wheel 32. In FIG. 15A, the magnitudes of the loads are represented as the lengths of arrows. The integrated control device 200 can make the left inclining wheel torque applied to the left inclining wheel 31 by the left inclining wheel torque applying unit 81 and the right inclining wheel torque applied to the right inclining wheel 32 by the right inclining wheel torque applying unit 82 different from each other in at least a part of a period in which the leaning posture control actuator 40 applies the lean torque to the linkage mechanism 5.

FIG. 15B shows an example in a case where the integrated control device 200 makes the left inclining wheel torque applied to the left inclining wheel 31 by the left inclining wheel torque applying unit 81 and the right inclining wheel torque applied to the right inclining wheel 32 by the right inclining wheel torque applying unit 82 different from each other based on the lean torque of the leaning posture control actuator 40. In the example illustrated in FIG. 15B, the lean torque increases the load on the left inclining wheel 31 so that a braking force of the left inclining wheel 31 on the road surface thereby gradually increases. In this case, for example, while the leaning posture control actuator 40 applies a lean torque, the integrated control device (200) can perform control of reducing a left braking force applied to the left inclining wheel 31. Accordingly, a difference in braking force between the left inclining wheel 31 and the right inclining wheel 32 on the road surfaces can be reduced. In this embodiment, control of reducing the left braking force applied to the left inclining wheel 31 is performed by reducing the left target skid ratio.

Examples of setting of the left target skid ratio and the right target skid ratio based on the lean torque are not limited to those described in the embodiment described above. In the embodiment, while the lean torque in the direction in which the load on the left inclining wheel increases, the right target skid ratio may be increased instead of reducing the left target skid ratio. In this case, while the lean torque in the direction in which the load on the right inclining wheel increases, the left target skid ratio may be increased instead of reducing the right target skid ratio.

The integrated control device may increase the left target skid ratio or reduce the right target skid ratio in at least a part of a period in which the lean torque in the direction in which the load on the left inclining wheel increases. In this case, the integrated control device may increase the right target skid ratio or reduce the left target skid ratio in at least a part of a period in which the lean torque in the direction in which the load on the right inclining wheel increases. Accordingly, a braking force about an axle of one of the left inclining wheel and the right inclining wheel whose load increases can be made larger than a braking force about an axle of the inclining wheel whose load decreases.

The configuration with which the integrated control device controls the left inclining wheel torque and the right inclining wheel torque is not limited to the configuration of setting the target skid ratios as described in the embodiment. For example, the integrated control device may control a brake fluid pressure of the left inclining wheel and a brake fluid pressure of the right inclining wheel to thereby control the left inclining wheel torque and the right inclining wheel torque. As an example, the integrated control device may set a ratio between the brake fluid pressure of the left inclining wheel and the brake fluid pressure of the right inclining wheel.

In this embodiment, the integrated control device controls forces of braking rotations of the left inclining wheel and the right inclining wheel about the axles as the left inclining wheel torque and the right inclining wheel torque. In addition or alternatively, the integrated control device may control forces of driving rotations of the left inclining wheel and the right inclining wheel about the axles as the left inclining wheel torque and the right inclining wheel torque. For example, each of the left inclining wheel and the right inclining wheel may be provided with a driving source such as an electric motor or an engine. Alternatively, the integrated control device may be configured to control a ratio between driving forces transferred from the driving source such as the electric motor or the engine to the left inclining wheel and the right inclining wheel. Application of braking forces to rotations of the left inclining wheel and the right inclining wheel about the axles may be regeneration or reverse driving by the motor as well as a brake.

In the manner described above, the left inclining wheel torque applying unit can be configured to apply a braking force or a driving force of the left inclining wheel about the axle to the left inclining wheel. The right inclining wheel torque applying unit can be configured to apply a braking force or a driving force of the right inclining wheel about the axle to the right inclining wheel.

The left inclining wheel torque applied to the left inclining wheel by the left inclining wheel torque applying unit and the right inclining wheel torque applied to the right inclining wheel by the right inclining wheel torque applying unit may be, for example, detected using torque sensors or may be acquired from control information for controlling the left inclining wheel torque applying unit and the right inclining wheel torque applying unit. In a case where the left inclining wheel torque applying unit and the right inclining wheel torque applying unit are brake units (brakes), for example, brake torques on the left inclining wheel and the right inclining wheel can be detected using detection values or instruction values, for example, of brake fluid pressures. In addition, in the case of using an engine as a driving source of the left inclining wheel and the right inclining wheel, for example, driving torques of the left inclining wheel and the right inclining wheel can be detected using an air volume or fuel supplied to the engine, a load on the engine, and the number of rotations of the engine, for example. In the case of using a motor as a driving source of the left inclining wheel and the right inclining wheel, driving torques of the left inclining wheel and the right inclining wheel can be detected using a current, a voltage, and an instruction value, for example, of the motor.

In the embodiment described above, the posture control device 200 as the integrated control device makes the left inclining wheel torque and the right inclining wheel torque different from each other when the lean torque exceeds the threshold. The configuration with which the integrated control device makes the left inclining wheel torque and the right inclining wheel torque different from each other in at least a part of the period in which the leaning posture control actuator applies the lean torque is not limited to the example described above. For example, the integrated control device may make the left inclining wheel torque and the right inclining wheel torque different from each other when generation of the lean torque is detected. Alternatively, it may be determined whether to make the left inclining wheel torque and the right inclining wheel torque different from each other based on a change rate of the lean torque. The integrated control device may change the degree of difference between the left inclining wheel torque and the right inclining wheel torque in accordance with the lean torque or the change rate of the lean torque.

In the embodiment described above, the posture control device 200 as the integrated control device controls the left inclining wheel torque and the right inclining wheel torque based on the lean torque applied to the linkage mechanism 5 by the leaning posture control actuator 40. On the other hand, the integrated control device may control the lean torque applied to the linkage mechanism 5 by the leaning posture control actuator 40 based on the left inclining wheel torque applied to the left inclining wheel and the right inclining wheel torque applied to the right inclining wheel. For example, the integrated control device can determine whether control of the lean torque by the leaning posture control actuator 40 is necessary or not and also can determine details of this control, using, as a trigger, application of a torque of braking rotation to at least one of the left inclining wheel or the right inclining wheel.

The integrated control device may include both a configuration for controlling the left inclining wheel torque and the right inclining wheel torque based on the lean torque and a configuration for controlling the lean torque based on the left inclining wheel torque and the right inclining wheel torque.

The configuration with which the integrated control device integrally controls the leaning posture control actuator, the left inclining wheel torque applying unit, and the right inclining wheel torque applying unit is not limited to a specific configuration. The integrated control device may be configured to supply an instruction value or an instruction signal indicating a lean torque, a left inclining wheel torque or a right inclining wheel torque, to the leaning posture control actuator, the left inclining wheel torque applying unit, or the right inclining wheel torque applying unit. Alternatively, the integrated control device may be configured to supply an instruction value or an instruction signal to a control unit for controlling the leaning posture control actuator or a control unit for controlling the left inclining wheel torque applying unit and the right inclining wheel torque applying unit.

In the embodiments described above, the skid ratio is a value indicating a speed difference between the wheels and the road surfaces. The right skid ratio calculator is an example of a right skid ratio detector. The left skid ratio calculator is an example of a left skid ratio detector. The expressions for obtaining the skid ratios are not limited to the above examples. For calculation of the skid ratios, braking torques or driving torques of the wheels with respect to rotations about the axles or estimated µ value as friction coefficients of the road surfaces on which the wheels travel, for example, may be used.

The leaning vehicle according to present teaching is not limited to the configuration including three wheels as described in the embodiments. A leaning vehicle including four or more wheels can also be included in the leaning vehicle according to the present teaching. As described in the embodiments, the left inclining wheel and the right inclining wheel are not limited to the left front wheel and the right front wheel. The left inclining wheel and the right inclining wheel may be a left rear wheel and a right rear wheel. The left inclining wheel and the right inclining wheel may not be steering wheels. Another inclining wheel may be a pair of inclining wheels disposed in the left-right direction.

The configuration of the linkage mechanism is not limited to the examples described in the embodiments. The linkage mechanism is a mechanism that changes relative positions of the left inclining wheel and the right inclining wheel in the top-bottom direction with respect to the body frame by rotating the rotary member relative to the body frame and thereby leans the leaning body frame to the left of the vehicle or to the right of the vehicle.

In the present teaching, a load on a wheel is a force exerted on a road surface by the wheel or its reaction force. The body frame is a member that receives a stress on the leaning vehicle during traveling. Examples of the body frame include a monocoque (stressed-skin structure), a semi-monocoque, and a structure in which a vehicle part also serves as a member that receives stress. For example, a part such as an engine or an air cleaner may be a part of the body frame.

REFERENCE SIGNS LIST 1, 1000 vehicle
200 posture control device
201 vehicle body speed calculator
202 left skid ratio calculator
203 right skid ratio calculator
204 skid ratio setting unit
205 skid suppression control unit
210 map memory

The invention claimed is:

1. A leaning vehicle provided with a leaning posture control actuator and left and right inclining wheels, the leaning vehicle comprising:
  a leaning body frame that leans leftward when the vehicle is turning leftward in a left-right direction of the vehicle, and leans rightward when the vehicle is turning rightward in the left-right direction of the vehicle;
  a left inclining wheel that is supported on the leaning body frame, leans leftward when the vehicle is turning leftward in the left-right direction of the vehicle, and leans rightward when the vehicle is turning rightward in the left-right direction of the vehicle;
  a right inclining wheel that is supported on the leaning body frame, is disposed at a side of the left inclining wheel in the left-right direction of the vehicle, leans leftward when the vehicle is turning leftward in the left-right direction of the vehicle, and leans rightward when the vehicle is turning rightward in the left-right direction of the vehicle;
  another inclining wheel that is supported on the leaning body frame, is disposed ahead of or behind the left inclining wheel and the right inclining wheel in a front-rear direction of the vehicle, leans leftward when the vehicle is turning leftward in the left-right direction of the vehicle, and leans rightward when the vehicle is turning rightward in the left-right direction of the vehicle;
  a linkage mechanism rotatably supported on the body frame and including a rotary member supporting the left inclining wheel and the right inclining wheel, the rotary member being configured to rotate in accordance with a lean of the leaning body frame in the left-right direction of the vehicle so that relative positions of the left inclining wheel and the right inclining wheel in a top-bottom direction relative to the body frame change;
  a leaning posture control actuator that controls a leaning posture of the leaning body frame in the left-right direction of the vehicle by applying, to the linkage mechanism, a lean torque that is a force of rotating the rotary member of the linkage mechanism with respect to the leaning body frame;
  a left inclining wheel torque applying unit that applies, to the left inclining wheel, a left inclining wheel torque that is a torque of the left inclining wheel about a first axle;
  a right inclining wheel torque applying unit that applies, to the right inclining wheel, a right inclining wheel torque that is a torque of the right inclining wheel about a second axle; and
  an integrated control device that integrally controls the leaning posture control actuator, the left inclining wheel torque applying unit, and the right inclining wheel torque applying unit, and either controls the left inclining wheel torque applied to the left inclining wheel by the left inclining wheel torque applying unit and the right inclining wheel torque applied to the right inclining wheel by the right inclining wheel torque applying unit in accordance with loads on the left inclining wheel and the right inclining wheel that vary depending on the lean torque applied to the linkage mechanism by the leaning posture control actuator or controls the lean torque applied to the linkage mechanism by the leaning posture control actuator based on the left inclining wheel torque applied to the left inclining wheel by the left inclining wheel torque applying unit and the right inclining wheel torque applied to the right inclining wheel by the right inclining wheel torque applying unit.

2. The leaning vehicle according to claim 1, wherein the integrated control device causes the leaning posture control actuator to apply, to the linkage mechanism, a lean torque of leaning the body frame leftward or rightward in the left-right direction of the vehicle in at least a part of a period in which the left inclining wheel torque applied to the left inclining wheel by the left inclining wheel torque applying unit is different from the right inclining wheel torque applied to the right inclining wheel by the right inclining wheel torque applying unit.

3. The leaning device according to claim 1, wherein the integrated control device makes the left inclining wheel torque applied to the left inclining wheel by the left inclining wheel torque applying unit and the right inclining wheel torque applied to the right inclining wheel by the right inclining wheel torque applying unit different from each other in at least a period in which the leaning posture control actuator applies, to the linkage mechanism, a lean torque of leaning the body frame leftward or rightward in the left-right direction of the vehicle.

4. The leaning vehicle according to claim 3, wherein
the integrated control device
controls the left inclining wheel torque applied by the left inclining wheel torque applying unit and the right inclining wheel torque applied by the right inclining wheel torque applying unit such that a braking force or a driving force on rotation of the left inclining wheel about the axle is larger than a braking force or a driving force on rotation of the right inclining wheel about the axle, in a case where the leaning posture control actuator generates a lean torque of leaning the body frame rightward in the left-right direction of the vehicle, and
controls the right inclining wheel torque applied by the right inclining wheel torque applying unit and the left inclining wheel torque applied by the left inclining wheel torque applying unit such that a braking force or a driving force on rotation of the right inclining wheel about the axle is larger than a braking force or a driving force on rotation of the left inclining wheel about the axle, in a case where the leaning posture control actuator generates a lean torque of leaning the body frame leftward in the left-right direction of the vehicle.

5. The leaning vehicle according to claim 3, wherein
the integrated control device
controls the left inclining wheel torque applied by the left inclining wheel torque applying unit and the right inclining wheel torque applied by the right inclining wheel torque applying unit such that a braking force or a driving force on rotation of the left inclining wheel about the axle is smaller than a braking force or a driving force on rotation of the right inclining wheel about the axle, in a case where the leaning posture control actuator generates a lean torque of leaning the body frame rightward in the left-right direction of the vehicle, and
controls the right inclining wheel torque applied by the right inclining wheel torque applying unit and the left inclining wheel torque applied by the left inclining wheel torque applying unit such that a braking force or a driving force on rotation of the right inclining wheel about the axle is smaller than a braking force or a driving force on rotation of the left inclining wheel about the axle, in a case where the leaning posture control actuator generates a lean torque of leaning the body frame leftward in the left-right direction of the vehicle.

6. The leaning vehicle according to claim 1, further comprising:
a left skid ratio detector that detects a skid ratio of the left inclining wheel; and
a right skid ratio detector that detects a skid ratio of the right inclining wheel, wherein
the integrated control device includes a brake control unit that adjusts the left inclining wheel torque that brakes rotation of the left inclining wheel about the axle by the left inclining wheel torque applying unit based on the skid ratio of the left inclining wheel detected by the left skid ratio detector and adjusts the right inclining wheel torque that brakes rotation of the right inclining wheel about the axle by the right inclining wheel torque applying unit based on the skid ratio of the right inclining wheel detected by the right skid ratio detector,
the integrated control device sets at least one of a left target skid ratio of the left inclining wheel or a right target skid ratio of the right inclining wheel based on the lean torque applied by the leaning posture control actuator, and
the brake control unit starts adjustment of the left inclining wheel torque that brakes rotation of the left inclining wheel about the axle by the left inclining wheel torque applying unit in a case where the skid ratio of the left wheel reaches the left target skid ratio, and starts adjustment of the right inclining wheel torque that brakes rotation of the right inclining wheel about the axle by the right inclining wheel torque applying unit in a case where the skid ratio of the right inclining wheel reaches the right target skid ratio.

7. The leaning vehicle according to claim 6, wherein the integrated control device sets at least one of the left target skid ratio of the left inclining wheel or the right target skid ratio of the right inclining wheel such that the left target skid ratio of the left inclining wheel and the right target skid ratio of the right inclining wheel are different from each other in at least a part of a period in which the leaning posture control actuator applies, to the linkage mechanism, a lean torque of leaning the leaning body frame leftward or rightward in the left-right direction of the vehicle.

8. The leaning vehicle according to claim 7, wherein
the integrated control device
sets at least one of the left target skid ratio of the left inclining wheel or the right target skid ratio of the right inclining wheel such that the right target skid ratio of the right inclining wheel is larger than the left target skid ratio of the left inclining wheel in at least a part of a period in which the leaning posture control actuator applies, to the linkage mechanism, a lean torque of leaning the leaning body frame leftward in the left-right direction of the vehicle, and sets at least one of the left target skid ratio of the left inclining wheel or the right target skid ratio of the right inclining wheel such that the left target skid ratio of the left inclining wheel is larger than the right target skid ratio of the right inclining wheel in at least a part of a period in which the leaning posture control actuator applies, to the linkage mechanism, a lean torque of leaning the leaning body frame rightward in the left-right direction of the vehicle.

9. The leaning vehicle according to claim 1, further comprising a rotation angle detector that detects a rotation angle of the leaning posture control actuator, wherein the integrated control device controls the left inclining wheel torque applied to the left inclining wheel by the left inclining wheel torque applying unit and the right inclining wheel torque applied to the right inclining wheel by the right inclining wheel torque applying unit based on the loads on the left inclining wheel and the right inclining wheel that vary depending on the lean torque applied to the linkage mechanism by the leaning posture control actuator and the rotation angle detected by the rotation angle detector.

10. The leaning vehicle according to claim 1, further comprising a lean detector that detects a lean state of the leaning body frame in the left-right direction of the vehicle, wherein the integrated control device controls the left inclining wheel torque applied to the left inclining wheel by the left inclining wheel torque applying unit and the right inclining wheel torque applied to the right inclining wheel by the right inclining wheel torque applying unit based on the loads on the left inclining wheel and the right inclining wheel that vary depending on the lean torque applied to the linkage mechanism by the leaning posture control actuator and the lean state detected by the lean detector.

* * * * *